(12) United States Patent
Nakada et al.

(10) Patent No.: US 11,759,710 B2
(45) Date of Patent: Sep. 19, 2023

(54) NON-TRANSITORY COMPUTER-READABLE STORAGE MEDIUM HAVING GAME PROGRAM STORED THEREIN, GAME APPARATUS, GAME PROCESS METHOD, AND GAME SYSTEM

(71) Applicant: NINTENDO CO., LTD., Kyoto (JP)

(72) Inventors: Ryuichi Nakada, Kyoto (JP); Akira Kinashi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 17/824,257

(22) Filed: May 25, 2022

(65) Prior Publication Data
US 2022/0280871 A1 Sep. 8, 2022

Related U.S. Application Data

(63) Continuation of application No. 17/236,121, filed on Apr. 21, 2021, now Pat. No. 11,369,875.

(30) Foreign Application Priority Data

Jun. 18, 2020 (JP) ................................ 2020-105328

(51) Int. Cl.
*A63F 13/45* (2014.01)
*A63F 13/56* (2014.01)

(52) U.S. Cl.
CPC ............. *A63F 13/56* (2014.09); *A63F 13/45* (2014.09)

(58) Field of Classification Search
CPC .......... A63F 13/56; A63F 13/45; A63F 13/42; A63F 13/44; A63F 13/47; A63F 13/50; A63F 2300/6045; A63F 2300/632
See application file for complete search history.

(56) References Cited

U.S. PATENT DOCUMENTS 7,497,777 B2 * 3/2009 Machida ................. A63F 13/67
463/9
8,282,454 B2 * 10/2012 Miyamoto .............. A63F 13/21
463/31

(Continued)

OTHER PUBLICATIONS

Nintendo Mario History—Mario Through the Years, electronically retrieved Apr. 22, 2021, 46 pages. https://mario.nintendo.com/history/.

(Continued)

*Primary Examiner* — David L Lewis
*Assistant Examiner* — Matthew D Hoel
(74) *Attorney, Agent, or Firm* — Nixon & Vanderhye PC

(57) ABSTRACT

A first game which advances independently of a plurality of opponent's game processes is started at the same start timings as the opponents. In the first game, a player object is controlled, a time limit is decreased with elapse of time, a time limit is increased if the player object has successfully performed a predetermined action, and advancement of the first game is ended when the time limit reaches zero. In addition, first game state data is transmitted to second information processing apparatuses, and second game state data is acquired from the second information processing apparatuses. Then, a display image including a first image based on the first game state data and a second image based on the second game state data is sequentially generated. If the first game is ended, evaluation relative to the opponents is performed in accordance with elapsed time since the start of the first game.

24 Claims, 23 Drawing Sheets

(56) References Cited

U.S. PATENT DOCUMENTS

| | | | | |
|---|---|---|---|---|
| 8,678,891 B2* | 3/2014 | Miyamoto | A63F 13/235 | 463/31 |
| 8,690,653 B2* | 4/2014 | Miyamoto | A63F 13/235 | 463/31 |
| 8,771,075 B2* | 7/2014 | Kim | G07F 17/3232 | 463/42 |
| 9,079,097 B2* | 7/2015 | Hansson | A63F 13/45 | |
| 9,149,724 B2* | 10/2015 | Liu | G06T 17/00 | |
| 9,254,439 B2* | 2/2016 | Miyamoto | A63F 13/10 | |
| 9,254,440 B2* | 2/2016 | Miyamoto | A63F 13/822 | |
| 9,259,649 B2* | 2/2016 | Miyamoto | A63F 13/21 | |
| 9,364,759 B2* | 6/2016 | Kim | A63F 13/56 | |
| 9,446,312 B2* | 9/2016 | Miyamoto | A63F 13/25 | |
| 9,457,276 B2* | 10/2016 | Slaby | A63F 13/56 | |
| 9,685,044 B2* | 6/2017 | Gangas | G07F 17/3267 | |
| 9,687,729 B2* | 6/2017 | Hansson | A63F 13/55 | |
| 9,710,974 B2* | 7/2017 | Ichimura | A63F 13/30 | |
| 9,821,228 B2* | 11/2017 | Miyamoto | A63F 13/56 | |
| 10,258,875 B2* | 4/2019 | Takemoto | A63F 13/79 | |
| 10,265,612 B2* | 4/2019 | Hansson | A63F 13/55 | |
| 10,828,558 B2* | 11/2020 | Hansson | A63F 13/57 | |
| 11,278,803 B2* | 3/2022 | Nakagawa | A63F 13/56 | |
| 11,369,875 B2* | 6/2022 | Nakada | A63F 13/533 | |
| 2004/0259634 A1* | 12/2004 | Machida | A63F 13/67 | 463/29 |
| 2008/0045340 A1* | 2/2008 | Kim | G07F 17/32 | 463/42 |
| 2012/0077585 A1* | 3/2012 | Miyamoto | A63F 13/25 | 463/31 |
| 2013/0005462 A1* | 1/2013 | Miyamoto | A63F 13/235 | 463/31 |
| 2013/0005468 A1* | 1/2013 | Miyamoto | A63F 13/25 | 463/36 |
| 2013/0005485 A1* | 1/2013 | Miyamoto | A63F 13/235 | 463/42 |
| 2014/0073435 A1* | 3/2014 | Liu | A63F 13/577 | 463/42 |
| 2014/0155163 A1* | 6/2014 | Miyamoto | A63F 13/10 | 463/31 |
| 2014/0155164 A1* | 6/2014 | Miyamoto | A63F 13/10 | 463/31 |
| 2014/0171172 A1* | 6/2014 | Gangas | G07F 17/3293 | 463/13 |
| 2014/0179430 A1* | 6/2014 | Miyamoto | A63F 13/45 | 463/31 |
| 2014/0287817 A1* | 9/2014 | Kim | A63F 13/45 | 463/23 |
| 2014/0309027 A1* | 10/2014 | Ichimura | A63F 13/12 | 463/31 |
| 2014/0370950 A1* | 12/2014 | Hansson | A63F 13/00 | 463/9 |
| 2015/0141148 A1* | 5/2015 | Hansson | A63F 13/23 | 463/36 |
| 2015/0273335 A1* | 10/2015 | Slaby | A63F 13/537 | 463/31 |
| 2016/0346692 A1* | 12/2016 | Miyamoto | A63F 13/20 | |
| 2017/0087461 A1* | 3/2017 | Takemoto | G06K 7/10 | |
| 2017/0246530 A1* | 8/2017 | Hansson | A63F 13/52 | |
| 2017/0266556 A1* | 9/2017 | Motohashi | A63F 13/45 | |
| 2017/0287286 A1* | 10/2017 | Gangas | G07F 17/3288 | |
| 2018/0008888 A1* | 1/2018 | Kim | A63F 13/825 | |
| 2018/0211493 A1* | 7/2018 | Gangas | G07F 17/3272 | |
| 2019/0176024 A1* | 6/2019 | Hansson | A63F 13/2145 | |
| 2019/0247758 A1* | 8/2019 | Lee | A63F 13/35 | |
| 2020/0101380 A1* | 4/2020 | Nakagawa | A63F 13/35 | |
| 2020/0134981 A1* | 4/2020 | Gangas | A63F 13/56 | |
| 2020/0324196 A1* | 10/2020 | Nakamura | A63F 13/56 | |
| 2020/0376378 A1* | 12/2020 | Fukawa | A63F 13/77 | |
| 2021/0370174 A1* | 12/2021 | Yamamura | A63F 13/44 | |
| 2021/0394058 A1* | 12/2021 | Nakada | A63F 13/31 | |
| 2021/0394063 A1* | 12/2021 | Nakada | A63F 13/35 | |
| 2021/0394065 A1* | 12/2021 | Nakada | A63F 13/45 | |

OTHER PUBLICATIONS

Nintendo 3DS—Super Mario Bros., electronically retrieved Apr. 22, 2021, 2 pages. https://www.nintendo.com/games/detail/super-mario-bros-3ds/.

* cited by examiner

NON-TRANSITORY COMPUTER-READABLE STORAGE MEDIUM HAVING GAME PROGRAM STORED THEREIN, GAME APPARATUS, GAME PROCESS METHOD, AND GAME SYSTEM

CROSS REFERENCE TO RELATED APPLICATION

This application is a continuation of U.S. application Ser. No. 17/236,121 filed Apr. 21, 2021, which claims priority to Japanese Patent Application No. 2020-105328 filed on Jun. 18, 2020, the entire content of each of which are incorporated herein by reference.

FIELD

The exemplary embodiments relate to a game process, and in particular, relate to a game process using a game produced on the premise that the game is played by one player.

BACKGROUND AND SUMMARY

Conventionally, there have been known games that are played by one player. For example, there are known an action game of a side-scrolling type, and the like.

A single-player game as described above is produced on the premise that the game is played by one player, and it is general that the placement positions of enemy objects in a game world, terrain configurations of stages, courses, and the like to be played, and the like are defined in advance. Therefore, while the player repeatedly plays the game many times, the player can remember appearing positions, appearing timings, action patterns, and the like of the enemy objects, and thus can predict how the game develops in advance to a certain extent.

Thus, in the single-player game as described above, it is possible to predict how the game develops to a certain extent by repeatedly playing the game. In addition, since the game is assumed to be played by one player, play by multiple players is not particularly taken into consideration.

Therefore, an object of the exemplary embodiments is to provide a novel game program and the like that allow playing while making it impossible to predict appearing patterns of enemy objects and game development which could be predicted conventionally.

Another object of the exemplary embodiments is to provide a non-transitory computer-readable storage medium having stored therein a novel game program and the like that allow multiple players to play a game created as a single-player game.

Still another object of the exemplary embodiments is to provide a novel game program and the like that allow a game created as a single-player game to be played with a game world having a configuration that differs every time the game is played.

Configuration examples for achieving the above objects will be shown below.

One configuration example is a non-transitory computer-readable storage medium having stored therein a game program to be executed by a processor of a first information processing apparatus, the game program causing the processor to: start execution of a first game based on a game process that advances independently of game processes executed by second information processing apparatuses of a plurality of opponents, such that a game start timing of the first game is adjusted to be the same as game start timings of the plurality of opponents; control a player object on the basis of an operation by a player in the first game; transmit first game state data regarding a game state of the first game, to each of the second information processing apparatuses; acquire second game state data regarding a game state of a second game executed in each of the second information processing apparatuses; sequentially generate a display image including a first image based on the first game state data and a second image based on the acquired second game state data; decrease a time limit set in advance for the player, with elapse of time; if the player object has successfully performed a predetermined action in the first game, add a predetermined value to the time limit; end advancement of the first game, at least when the time limit reaches zero; and if advancement of the first game is ended, perform evaluation for a result of the first game relative to results of the plurality of second games, in accordance with a length of actual time that has elapsed since start of execution of the first game.

According to the above configuration example, it is possible to provide the player with an unprecedented novel competitive game using a game process that advances individually and independently of game processes in other information processing apparatuses.

In another configuration example, the game program may further cause the processor to cause an obstructing object for obstructing advancement of the first game to appear in the first game. If the player object has successfully performed the predetermined action on the obstructing object, the predetermined value may be added to the time limit.

According to the above configuration example, it is possible to provide a motivation to try the predetermined action on the obstructing object during advancement of the game, in order to increase the time limit.

In another configuration example, the obstructing object may be restricted from appearing, until a predetermined condition regarding a position of the player object in a virtual game space is satisfied in the first game.

According to the above configuration example, since the obstructing object does not appear unless the player object is moved, it becomes necessary to move the player object and advance the game in order to increase the time limit. Thus, the player can be provided with a motivation to advance the game.

In another configuration example, a plurality of kinds of actions may be defined for the predetermined action on the obstructing object by the player object. The predetermined value to be added to the time limit may be different in accordance with the kind of the action.

According to the above configuration example, a value added to the time limit differs in accordance with the attack method. Therefore, for example, it is possible to selectively use an attack method that is high in the risk and high in the addition value, and an attack method that is low in the risk and low in the addition value, whereby game play variations can be increased and amusement of the game can be enhanced.

In another configuration example, the first game and the second game may be the same game.

According to the above configuration example, a plurality of players can be caused to play identical games, so that the players play under the same condition, whereby the players can be prevented from feeling unfair.

In another configuration example, a placement position of the obstructing object at a time of game start may be the same between the first game and the second game.

According to the above configuration example, a plurality of players can be caused to play under the same condition, whereby the players can be prevented from feeling unfair.

In another configuration example, a plurality of game courses which are virtual game spaces to be game-played may be included in the first game. The game program may further cause the processor to select a game course from among a predetermined plurality of game courses on the basis of an operation by the player, at a time of game start, and generate one connected course by connecting, in a predetermined order, game courses selected by the player and the opponents. The first game may be a game using the connected course.

According to the above configuration example, it is possible to provide a connected course having a configuration that differs every time the game is played, leading to enhancement in amusement of the game.

In another configuration example, the game courses may be connected in the predetermined order determined on the basis of play histories regarding the game programs of the player and the opponents, to generate one connected course.

According to the above configuration example, for example, the order in which courses are connected can be determined on the basis of the number of times of play, and the course selected by the player who has played a fewer number of times can be caused to appear at an earlier part of the connected course. Thus, it is possible to generate the connected course while taking game experiences, game skills, and the like of the players into consideration. For example, a course that can be played even by a player who has played a fewer number of times may appear at an earlier part of the connected course, whereby a player who is inexperienced in game can be prevented from readily becoming unable to advance the game.

In another configuration example, selectable game courses among the plurality of game courses may be different on a player-by-player basis.

According to the above configuration example, variations in the connected course configuration can be increased.

In another configuration example, a first obstructing object for obstructing advancement of the first game may be caused to appear in the first game on the basis of a predetermined rule, and if the acquired second game data indicates that the player object operated by the opponent has successfully performed the predetermined action on the first obstructing object that has appeared in the second game, a second obstructing object may be caused to appear in the first game. If the player object has successfully performed the predetermined action on the first obstructing object in the first game, information for causing the second obstructing object to appear in the second game for a predetermined opponent may be transmitted so as to be included in the first game data.

According to the above configuration example, it is possible to allow the player to also enjoy offense and defense in the competitive game, with a sense of normally playing on a game process that advances individually and independently of game processes in the other information processing apparatuses.

In another configuration example, if the second game for the opponent is made into an advancement impossible state by the second obstructing object that has appeared in the second game on the basis of the transmitted first game data, at least a part of a remaining time limit of the opponent at that time may be given to the player.

According to the above configuration example, the player can be provided with a motivation to cause the second obstructing object to appear in the opponent's game. This leads the players to send in the second obstructing objects to each other, whereby the players can enjoy offense and defense for increasing or decreasing the time limits and thus amusement of the game can be enhanced.

In another configuration example, if the first game is made into an advancement impossible state by the second obstructing object that has appeared in the first game, at least a part of a remaining time limit of the player at that time may be given to the opponent who has caused the second obstructing object to appear, and if the first game is made into an advancement impossible state by the first obstructing object appearing in the first game, or if the first game is made into an advancement impossible state not due to the first obstructing object while the second obstructing object is not present in the first game, addition of a time limit to the opponent may be restricted.

According to the above configuration example, if the player falls into an advancement impossible state because of the second obstructing object, this results in giving an advantage to the opponent. Therefore, the player can choose, for example, whether to aggressively defeat the second obstructing object or take such an action as to avoid the second obstructing object daringly, whereby play variations of the player can be increased.

In another configuration example, if the player object has successfully performed the predetermined action on the first obstructing object, an appearance instruction for causing the same object as the first obstructing object to appear as the second obstructing object in the second game may be further transmitted.

According to the above configuration example, for example, if the player has successfully performed the predetermined action on the first obstructing object having a high attack ability, the first obstructing object having a high attack ability can be caused to appear as the second obstructing object in the opponent's game. As a result, it is highly expected that opponent's game advancement is obstructed by the second obstructing object. Thus, the player can be provided with options for whether or not to take a risk for successfully performing the predetermined action on the first obstructing object having a high attack ability, whereby game amusement can be enhanced.

In another configuration example, the second obstructing object may be displayed in a display manner different from that of the first obstructing object.

According to the above configuration example, the player can easily discriminate between the first obstructing object and the second obstructing object. As a result, the player can be provided with room for choice such as not trying the predetermined action for the second obstructing object, for example, whereby game amusement can be enhanced.

In another configuration example, the first game may be a game in which the player object is moved in a predetermined advancing direction in a virtual game world. Further, the second obstructing object may be caused to appear at a predetermined position that is on the advancing direction side with respect to a present position of the player object in the virtual game world, the predetermined position not being included in a screen displayed at present.

According to the above configuration example, the second obstructing object appears at a position that is frontward in the game advancing direction and is not displayed in the virtual game world at present. Thus, such a situation that the player leaves the player object without moving the player object can be prevented, and a motivation to advance the game can be provided.

In another configuration example, in a case where there are a plurality of the second obstructing objects to appear, each second obstructing object may be caused to appear at the predetermined position such that, the earlier a timing at which the player object operated by the opponent has successfully performed the predetermined action on the first obstructing object appearing in the second game is, the closer the predetermined position is to the present position of the player object.

In another configuration example, a plurality of kinds may be set for the second obstructing object. Further, the predetermined position for the second obstructing object to appear may be adjusted in accordance with the kind of the second obstructing object.

According to the above configuration example, the second obstructing object can be caused to appear at an appropriate position in accordance with the nature and the property of the second obstructing object.

In another configuration example, adjustment may be made so as not to cause the second obstructing object to appear at such a position that makes it impossible to advance the first game when the second obstructing object appears at the position.

According to the above configuration example, the game can be prevented from becoming unable to advance due to the relationship between the property of the second obstructing object and the appearing position thereof.

In another configuration example, if the player object operated by the player has successfully performed the predetermined action on the second obstructing object that has appeared in the first game, information for causing the same object as the second obstructing object to appear, in at least one of the second games, as the second obstructing object in the second game, may be transmitted so as to be included in the first game data.

According to the above configuration example, the second obstructing object that has been sent in from the opponent can be further caused to appear in another opponent's game. Thus, the second obstructing objects can be sent in between the players further actively, whereby game amusement can be enhanced.

In another configuration example, a third image for giving a pre-notice of appearing positions of the first obstructing object and the second obstructing object may be generated so as to be included in the display image.

According to the above configuration example, the appearing positions of the obstructing objects are allowed to be recognized in advance to a certain extent, whereby player's convenience can be enhanced.

In another configuration example, the game program may further cause the processor to: select, on the basis of an operation by the player, one of a predetermined plurality of policies each of which is a policy for selecting at least one of the plurality of opponents; and specify at least one of the plurality of opponents as a target on the basis of the selected policy, and if the player object has successfully performed the predetermined action on the first obstructing object in the first game, information for causing the second obstructing object to appear in the second game for the opponent specified as the target may be transmitted so as to be included in the first game data.

According to the above configuration example, it is possible to provide room for selecting the opponent at which the second obstructing object is caused to appear, to a certain extent. Thus, for example, the player can consider what type of opponent is to be targeted for causing the second obstructing object to appear, whereby the game can be imparted with strategic characteristics and also amusement of the game can be enhanced.

According to the exemplary embodiments, it is possible to provide an unprecedented novel game using a game created for single-play usage.

DETAILED DESCRIPTION OF NON-LIMITING EXAMPLE EMBODIMENTS

Figure 1:
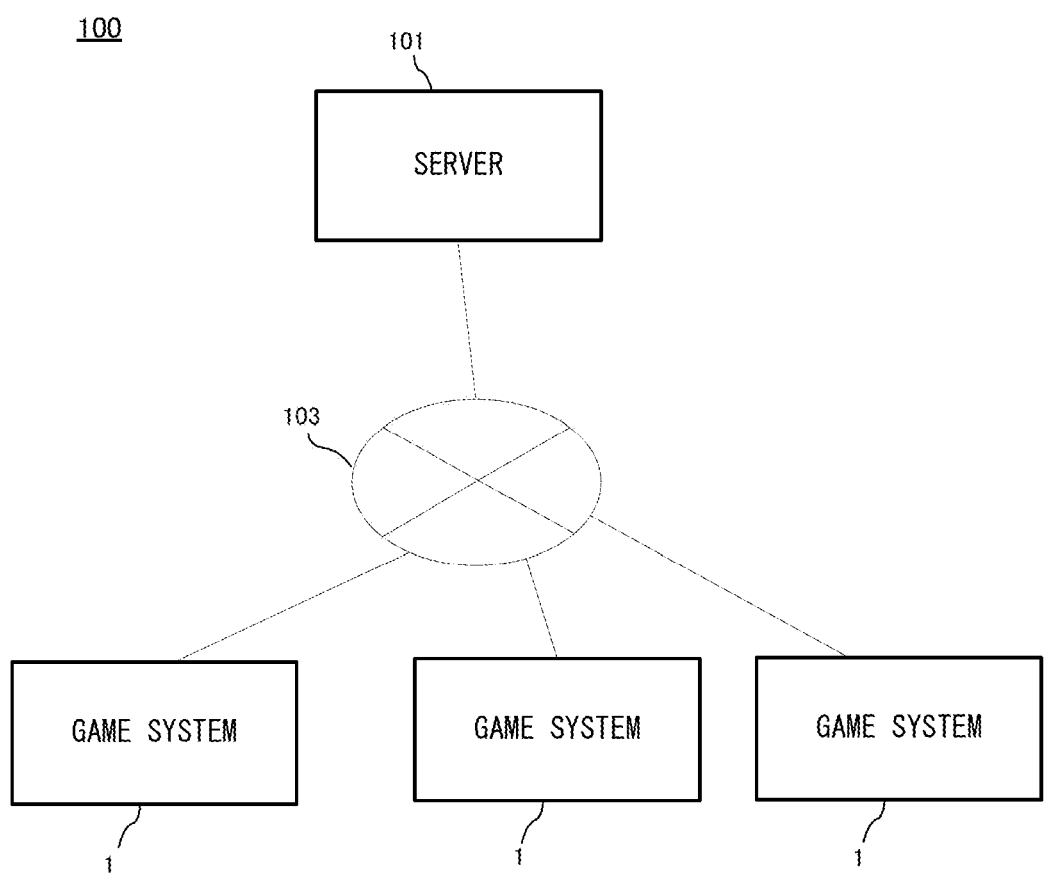
FIG. 1 is a schematic diagram showing a non-limiting example of the entire configuration of an information processing system according to one exemplary embodiment.

Hereinafter, one exemplary embodiment will be described. FIG. 1 is a schematic diagram showing the entire configuration of an information processing system according to the exemplary embodiment. An information processing system 100 according to the exemplary embodiment includes a server 101 and a plurality of game systems 1. The server 101 and each game system 1 are configured to be communicable with each other via the Internet 103.

As an example of an information process executed in the configuration as described above, a game process will be described in the exemplary embodiment. Specifically, in each game system 1, a game process that advances independently of the other game systems 1 is executed on the basis of an operation by a single user. Then, in parallel with the game process, predetermined data based on the game process are transmitted and received between the game systems 1 via the server 101, whereby a game process that realizes a multiplayer competitive game is executed.

Figure 2:
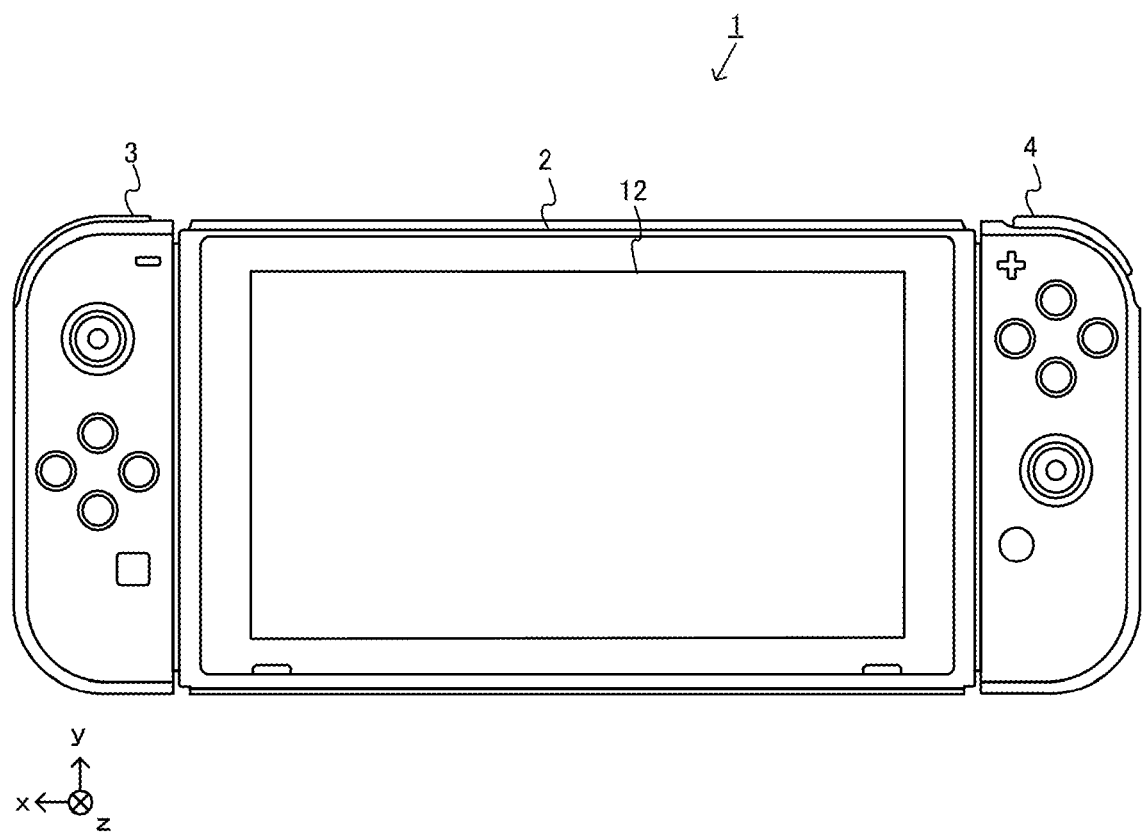
FIG. 2 is an external view showing a non-limiting example of a game system.

Next, the game system 1 according to the exemplary embodiment will be described. Although the game system may be any type, FIG. 2 shows, as an example, an external view of a game system used in the exemplary embodiment. A game system 1 shown in FIG. 2 includes a main body apparatus (an information processing apparatus which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies. FIG. 2 shows an example of a state in which the left controller 3 and the right controller 4 are attached to the body apparatus 2. As shown in FIG. 2, the left controller 3 and the right controller 4 are attached to the body apparatus 2 so as to be unified. The body apparatus 2 is an apparatus that executes various types of processes (e.g., game process) in the game system 1. The body apparatus 2 is provided with a display 12. The left controller 3 and the right controller 4 are devices having operation portions for a user to perform an input.

Figure 3:
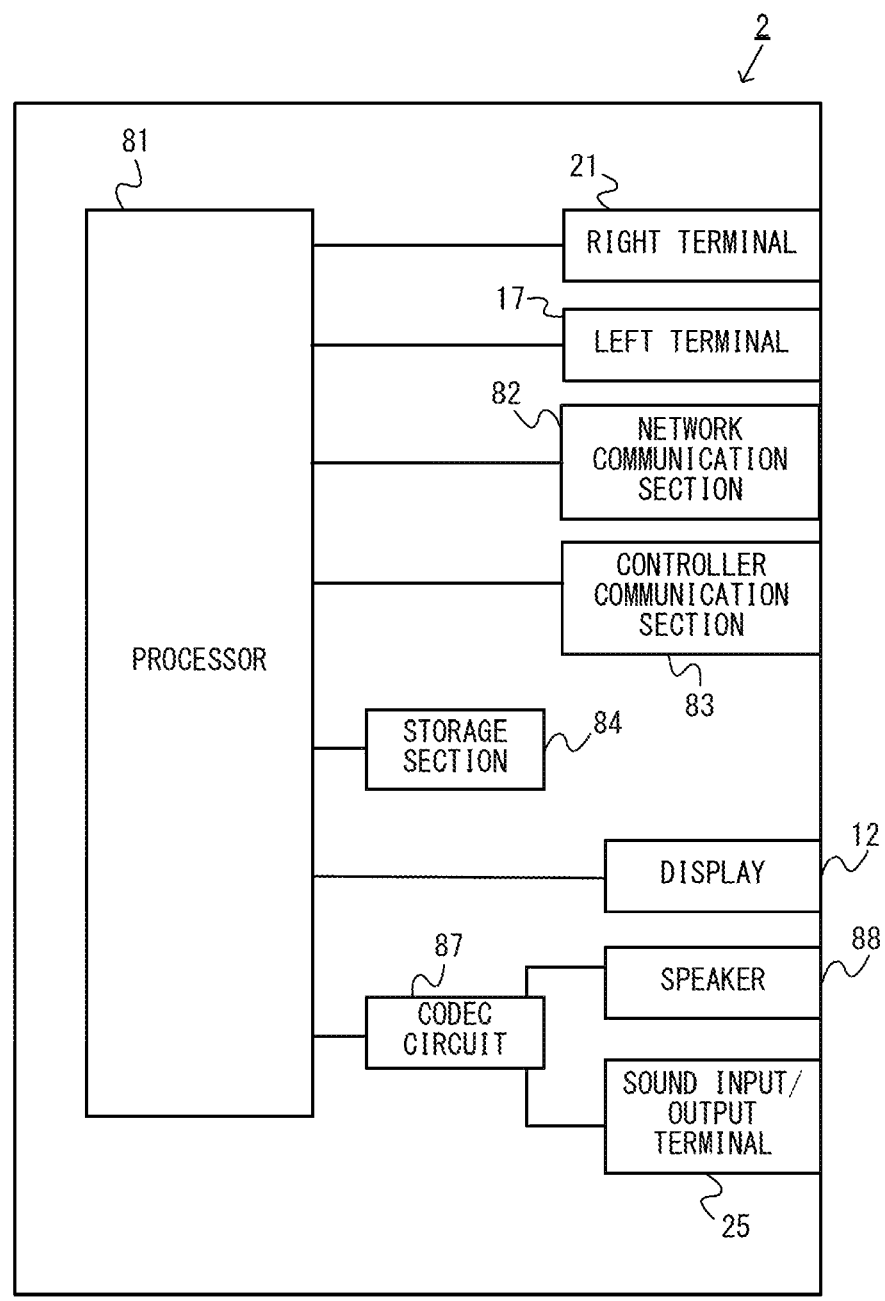
FIG. 3 is a block diagram showing a non-limiting example of the internal configuration of a body apparatus 2.

FIG. 3 is a block diagram showing an example of the internal configuration of the body apparatus 2. The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section 84, thereby performing the various types of information processing. The storage section 84 may be an internal storage medium such as a flash memory or a dynamic random access memory (DRAM), or may be realized using, for example, an external storage medium mounted to a slot (not shown).

The body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another body apparatus 2 of the same type, using a predetermined communication method (e.g., communication based on a unique protocol or infrared light communication). It should be noted that the wireless communication in the above second communication form achieves the function of enabling so-called "local communication" in which the body apparatus 2 can wirelessly communicate with another body apparatus 2 placed in a closed local network area, and the plurality of body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4, when the body apparatus 2, and the left controller 3 and right controller 4, are used separately from each other. The communication method between the main body apparatus 2, and the left controller 3 and the right controller 4, is optional. In the exemplary embodiment, the controller communication section 83 performs communication compliant with the Bluetooth (registered trademark) standard with the left controller 3 and with the right controller 4.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Although not shown, an image or a sound generated in the body apparatus 2 can be outputted to an external monitor or an external speaker via a predetermined output terminal.

[Controller]

Although not shown, the left controller 3 and the right controller 4 each include a communication control section for performing communication with the body apparatus 2. In a state in which the left controller 3 and the right controller 4 are attached to the body apparatus 2, the wired communication can be performed via the left terminal 17 and the right terminal 21. On the other hand, in the case where the body apparatus 2, and the left controller 3 and the right controller 4, are used separately from each other, it is possible to perform wireless communication with the body apparatus 2 not via the terminals. The communication control section acquires information about an input (specifically, information about an operation) from each of input portions of the controller. Then, the communication control section transmits operation data including the acquired information (or information obtained by performing predetermined processing on the acquired information), to the body apparatus 2. It is noted that the operation data is repeatedly transmitted at intervals of once every predetermined time. It is noted that the intervals at which the information about an input is transmitted to the body apparatus 2 may be the same among the input portions, or may be different thereamong.

[Hardware Configuration of Server]

Figure 4:
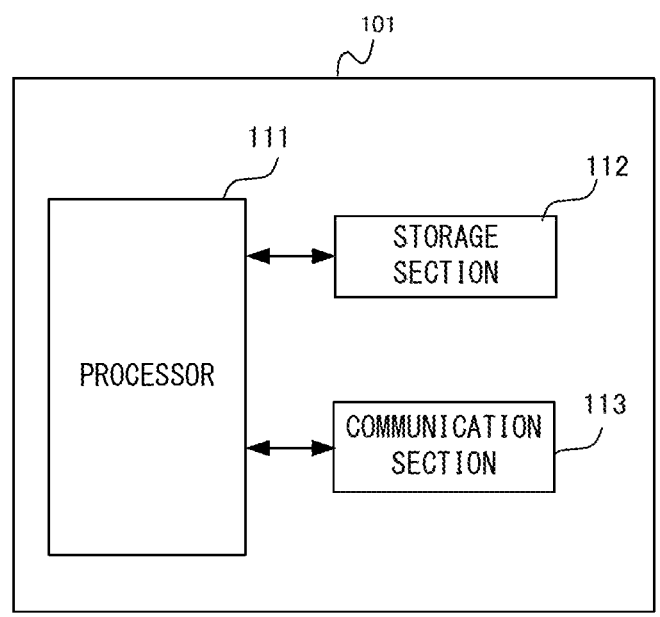
FIG. 4 is a block diagram showing a non-limiting example of the internal configuration of a server 101.

Next, the configuration of the server 101 will be described. FIG. 4 is a block diagram showing an example of the internal configuration of the server 101. The server 101 at least includes a processor 111, a storage section 112, and a communication section 113. The processor 111 executes various kinds of programs for controlling the server 101. Various kinds of programs to be executed and various kinds of data to be used by the processor 111 are stored in the storage section 112. The communication section 113 is connected to the Internet 103 via wired or wireless communication, and transmits/receives predetermined data to/from the game system 1.

[Outline of Game Process in the Exemplary Embodiment]

Next, the outline of the game process assumed in the exemplary embodiment will be described. In the exemplary embodiment, a competitive game is assumed. However, this game is not such a game that player objects operated by a plurality of players appear in the same play field or that the screen is shared. In this game, each player plays a game individually and independently on the own screen, while realizing competition processing. The game played by each player individually is basically designed as a single-player game. Hereinafter, as a premise for description of the competitive game according to the exemplary embodiment, the game designed as a single-player game will be described. Specifically, in the exemplary embodiment, a jump action game of a side-scrolling type will be described as an example of the above-described game. In addition, in this game, a virtual 2-dimensional space is used as a virtual game space.

[Jump Action Game]

Figure 5:
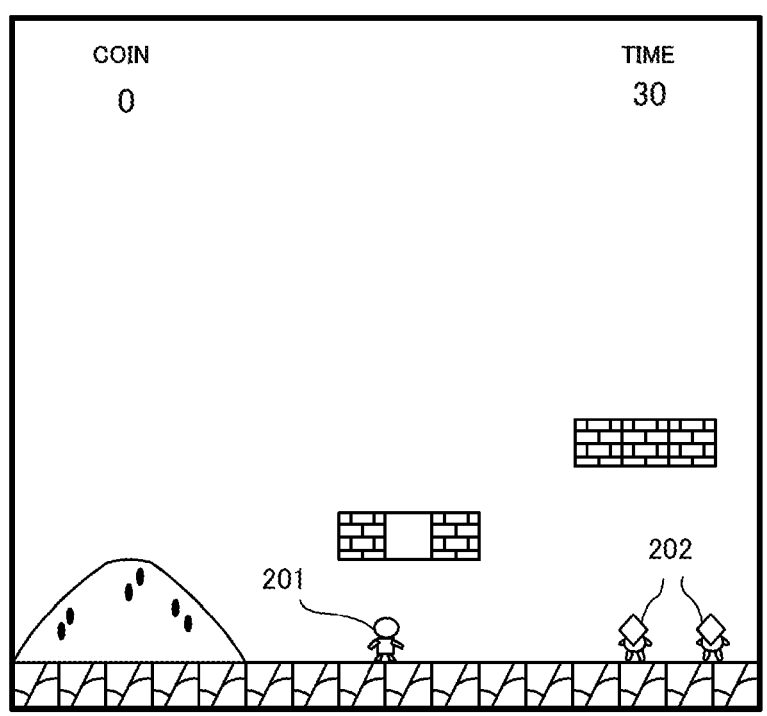
FIG. 5 shows a non-limiting example of a game image of a jump action game according to the exemplary embodiment.

FIG. 5 shows an example of a game screen in the jump action game. In FIG. 5, a player object 201 to be operated by the player is shown. In addition, enemy objects 202 described later and other block-shaped objects are also displayed. In this game, there are a plurality of "courses" prepared, which are each formed by a virtual 2-dimensional space having an area corresponding to a plurality of screens. As the courses, various environmental motifs are prepared, e.g., a plain ground, a volcanic area, underwater, a dungeon, and the like. While clearing the plurality of courses in a predetermined order, the player aims to complete the game. For example, the game progresses in the order of "course 1, course 2, course 3, . . . , final course". Then, the player moves the player object 201 from a "start point" to a "goal point" set in each course. When the player object 201 finally reaches the goal point, the "course" is "cleared". In addition, in the exemplary embodiment, in principle, the start point is set near the left end of the course, and the goal point is set near the right end of the course. Therefore, the basic advancing direction (screen scrolling direction) is the "rightward direction". In this game, the screen is not scrolled in the direction opposite to the advancing direction. In the exemplary embodiment, when the player object 201 is moved in the rightward direction in a displayed range of the screen, the screen is scrolled toward the rightward direction accordingly. On the other hand, when the player object 201 is moved in the leftward direction, the screen is not scrolled and the player object 201 cannot move beyond the left end position in the displayed range of the screen at that time.

In addition, various "obstructing objects" are placed on the way of each course from the start point to the goal point. The obstructing objects are various non-player objects mainly for obstructing advancement of the player object 201 to the goal point. A typical obstructing object is the enemy object 202 for which collision detection with the player object 201 can be performed. Another example of the obstructing object may be an object with a motif of a gimmick such as "trap". In the exemplary embodiment, the enemy object 202 is described as an example of the obstructing object. Basically, when the obstructing object and the player object 201 come into contact with each other in a manner other than "attack" described later, the player object 201 is damaged, a life thereof is lost, or another event disadvantageous in advancement of the game occurs. It is noted that the aforementioned block-shaped object has a collision area against the player object 201, but is treated as a kind of "terrain object" constituting the course and is not treated as an obstructing object in the exemplary embodiment.

Here, each of the enemy objects 202 placed in the course moves in the course on the basis of a predetermined routine, and basically, does not start the movement unless the player object 201 comes close thereto to a certain extent. For example, the enemy object 202 initially placed near the goal point does not start its movement, at the time immediately after the course is started to be played. The enemy object 202 starts to move when the player object 201 comes close to such a position immediately before the enemy object 202 is displayed in the screen.

Next, a method for attacking the enemy object 202 in the exemplary embodiment will be described. In the above jump action game, the player object 201 can perform various actions such as jump and dash movement. In the jump action game, it is possible to attack the enemy object 202 in such a manner that the player object 201 jumps to stomp on the enemy object 202. Hereinafter, the attack of stomping on the enemy object is referred to as stomping attack action. If the stomping attack action has succeeded, the enemy object can be defeated. As another attack method, it is also possible to defeat an enemy by shooting a bullet to hit the enemy and thus damaging the enemy (hereinafter, this attack method is referred to as shooting attack action). In the exemplary embodiment, the player object 201 has only the attack method of the stomping attack action by jumping in the initial state, and temporarily becomes able to perform a shooting attack action with use of a power-up item described later.

Without succeeding in each attack action described above, if, for example, the player object 201 comes into contact with the enemy object 202, this is treated as loss of one life, so that the remaining lives of the player object 201 decrease by one. For example, in a case where there are three remaining lives of the player object 201 in the initial state when the game is started, this means that the player is only allowed to lose a life up to three times.

While defeating the enemy object 202 with the attack actions as described above or avoiding the enemy object 202 by a jump action or the like, the player moves the player object 201 to the goal point. Then, when reaching the goal point, the course is cleared, and thus the player is allowed to advance to the next course.

[Time Limit]

In this jump action game, a time limit is set for clearing the course, and the player is required to reach the goal point before the time limit becomes 0. The time limit is displayed at an upper right part of the game screen shown in FIG. 5. Then, if the player fails to reach the goal within the time limit, one life is lost. Here, the time limit can be extended by defeating enemy objects. For example, the initial value of the time limit at the start of play in each course is assumed to be 30 counts, and decreases by one count per second. Meanwhile, every time one enemy object 202 is defeated, a predetermined value is added to the remaining time. In addition, a time to be added differs depending on the kind of the attack method. Specifically, in a case where the enemy object 202 is defeated by the stomping attack action, five counts are added, and in a case where the enemy object 202 is defeated by the shooting attack action, three counts are added. That is, for the shooting attack, a smaller addition value is set than for the stomping attack. The reason is as follows. When attacking the enemy, it is considered that there is a lower risk in the shooting attack than in the stomping attack action, and therefore, a longer time is added for the attack method with a higher risk, thus enhancing amusement of the game.

[Coin]

In this jump action game, a plurality of coin objects (not shown) are placed as appropriate at predetermined positions in the course. The coin objects are objects set to be immovable. When the player object comes into contact with the coin object, the coin object is acquired so as to become a "possessed coin" of the player object 201. The number of the possessed coins is displayed at an upper left part of the game screen shown in FIG. 5. In this jump action game, it is possible to use a predetermined item (hereinafter, power-up item) that gives an advantage to the player on the condition that the possessed coins are consumed. Specifically, in a state in which a predetermined number of coins or more are possessed, if a button assigned for using the power-up item is pressed, one of several kinds of power-up items is selected by lottery, and the selected power-up item can be used immediately. The power-up items serve to, for example, power-up the player object 201, temporarily make the player object 201 invincible, or defeat all the enemy objects 202 in the screen at the time of usage thereof. The effect of powering-up the player object 201 is, for example, temporarily increasing attack means of the player object (enabling the aforementioned shooting attack), or the like. Therefore, if the state in which a lot of coins are possessed can be kept, the player object can be constantly made into a powered-up state, whereby it is possible to advance the game more advantageously.

[Competitive Game According to the Exemplary Embodiment]

The jump action game described above is a game designed as a single-player game. In the single-player game referred to in the exemplary embodiment, it is assumed that, for example, in the play screen (game world) in which the player object 201 operated by the player is appearing, a player object operated by another player does not appear. In addition, it is assumed that the initial placement positions of the enemy objects 202 in the course have been determined in advance. Therefore, in this jump action game, basically, while repeatedly playing the game many times, the player can remember the placement positions, the appearing positions, and the behavior patterns of the enemy objects 202, and thus it may become possible to advance the game advantageously. In other words, in the single-player game referred to in the exemplary embodiment, the player can predict the appearing positions of enemies and the game development (to a certain extent).

Meanwhile, the competitive game according to the exemplary embodiment provides such a novel game that, using the single-player game as described above, the appearing patterns of enemies and the game development which could be predicted conventionally are made variable so that the player is allowed to enjoy an unpredictable game. Hereinafter, the outline of the competitive game according to the exemplary embodiment will be described.

First, the game according to the exemplary embodiment has two game modes. The first one is a "single-play mode" for enjoying the jump action game simply as a single-player game without competitive feature, and the second one is a "competitive mode" in which a competitive game process as described below is performed. In the exemplary embodiment, the competitive game in the competitive mode is a game in which up to thirty-five players including the player him/herself can participate. It is noted that the player object 201 has only one remaining life in the competitive mode. That is, losing a life even once results in game over, so that the game is not allowed to advance any more. In the competitive game, while playing the jump action game, each participant can send in an "assassin" described later, to lead another participant to game over. Then, the winning condition of this competitive game is to "become the last surviving player". As it were, the competitive mode is a kind of battle-royal-like game mode.

[Screen Example in Competitive Mode]

Figure 6:
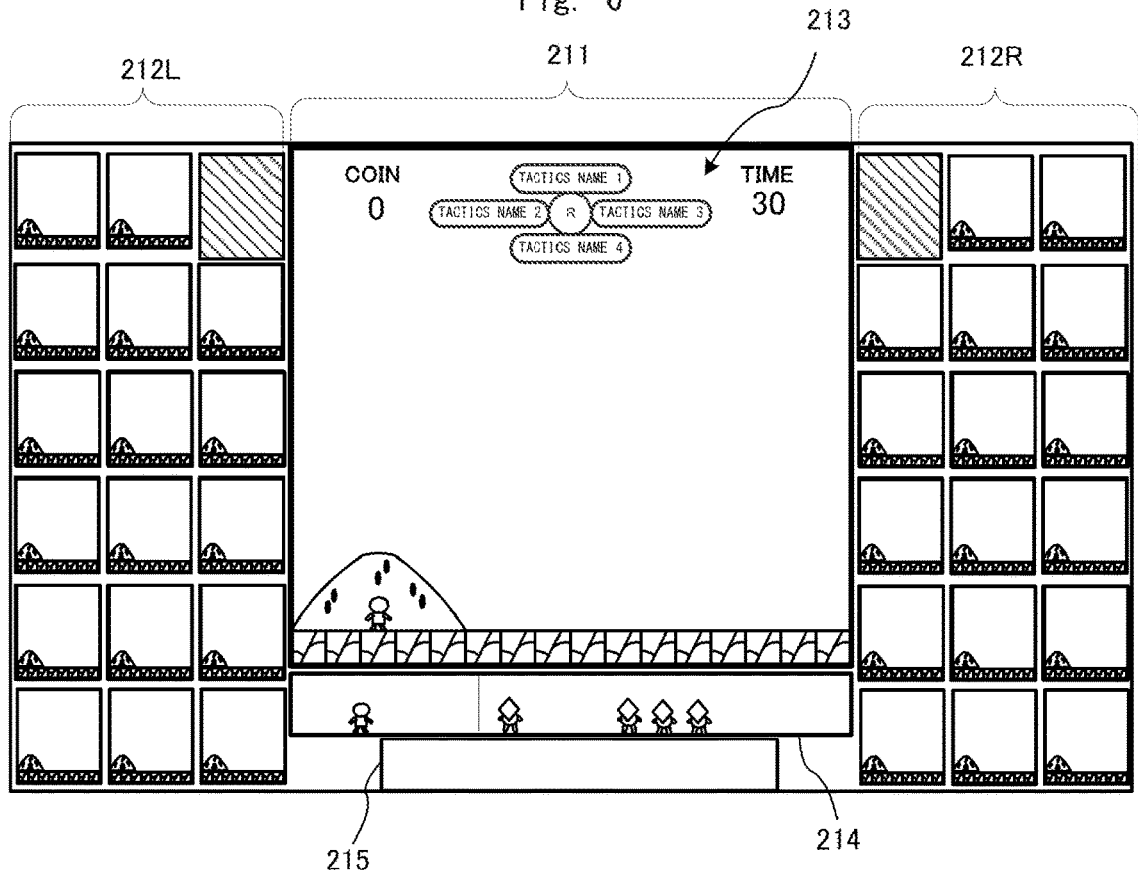
FIG. 6 shows a non-limiting example of a competitive game image according to the exemplary embodiment.

FIG. 6 shows an example of a game screen in the competitive game according to the exemplary embodiment. In the game screen shown in FIG. 6, the display area is divided into three areas along the horizontal direction of the screen. In FIG. 6, a first area 211 is located at a center part of the screen. A second area 212L is located at the left of the first area 211 and a second area 212R is located at the right of the first area 211 (they may be collectively referred to as second areas 212). This screen can be displayed on the display 12 of the game system 1 of each participant in the competitive game.

Figure 7:
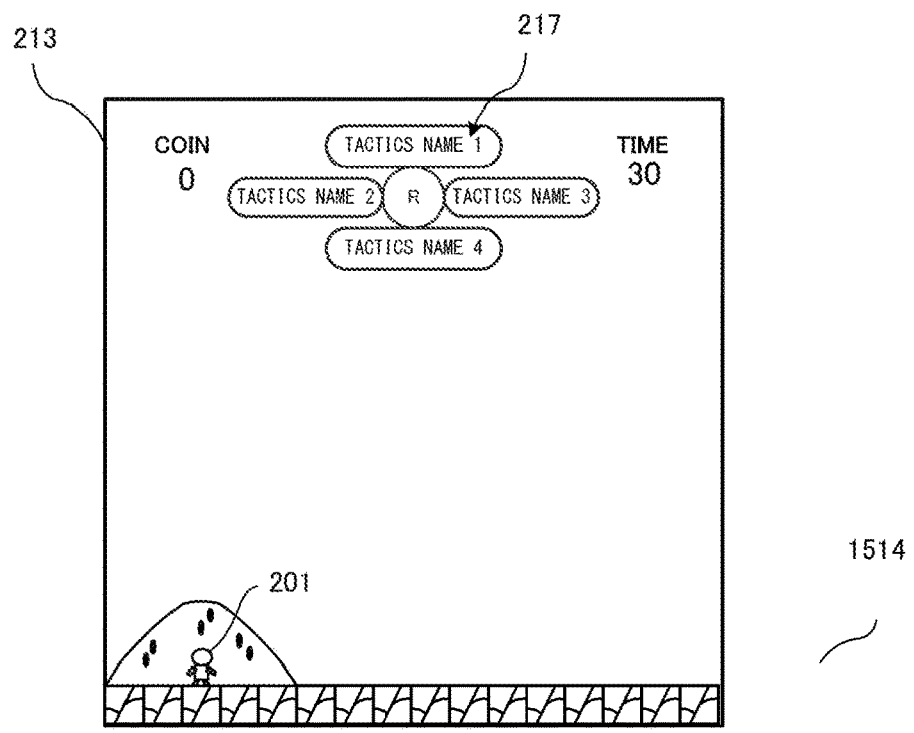
FIG. 7 shows a non-limiting example of a game image displayed in an action game area 213.

The first area 211 includes at least an action game area 213 in which a game image of the above-described jump action game is displayed, a pre-notice area 214, and a warning area 215. The pre-notice area 214 and the warning area 215 will be described later. First, the action game area 213 will be described. Each participant in the competitive game performs an action-game operation on the own action game area 213, to advance the jump action game individually on a participant basis. FIG. 7 shows an enlarged view of the action game area 213. In the action game area 213, the player object 201 as shown in FIG. 5 is displayed. In addition, although not shown in FIG. 7, the enemy object 202 and the like can be displayed as appropriate. In addition, images for indicating the number of possessed coins and the time limit are also displayed in the same manner as in FIG. 5.

As a display element which is not present in FIG. 5, a tactics operation panel 217 is displayed near the upper end of the action game area 213 on the screen in FIG. 7. The tactics operation panel 217 is used for selecting "tactics". Although described in detail later, the "tactics" is an example of a policy for selecting an opponent (hereinafter, referred to as target) to which an "assassin" is sent as described later. The processor 81 sets a predetermined user among thirty-four opponents, as a "target", on the basis of the tactics selected at this time. In the exemplary embodiment, an operation for selecting the tactics is performed using an analog stick provided to the right controller 4. When the analog stick is tilted in the up, down, left, or right direction, one of the four tactics corresponding to each direction is selected. In FIG. 7, a circle image representing the analog stick is displayed substantially at the center of the tactics operation panel 217, and option images indicating the tactics names are displayed in the up, down, left, and right directions of the circle image. With this configuration, it is possible to swiftly perform an operation for selecting the tactics almost without disturbing the player's game operation.

It is noted that the game process executed in the action game area 213 is basically the single-player jump action game as described above, and therefore the player object 201 operated by any opponent does not appear or is not displayed in the action game area 213.

With reference to FIG. 6 again, images indicating the states of the action game areas 213 of the jump action games that are being played by players (hereinafter, referred to as opponents) other than the self-player (i.e., game states of the respective opponents) are displayed in the second area 212L and the second area 212R. Hereinafter, these images are referred to as opponent images. The second areas 212 each include eighteen image display areas for displaying images, and these image display areas are arranged in a grid form. In the second area 212L, opponent images for seventeen opponents can be displayed in seventeen areas other than one area at the right end uppermost position. In addition, in the second area 212R, opponent images for seventeen opponents can be displayed in seventeen areas other than one area at the left end uppermost position. That is, in the second areas 212, images indicating the game states for a total of thirty-four opponents can be displayed. As an example, an image obtained by omitting indications of the number of possessed coins, the time limit, and the tactics operation panel 217 from the game image in the action game area 213 is displayed as the opponent image. In the exemplary embodiment, decorative images are displayed in the areas at the right end uppermost position in the second area 212L and the left end uppermost position in the second area 212R. In another exemplary embodiment, information indicating the advancement status of the competitive game or the like may be displayed there. For example, information indicating how many participants remain without ending up game over among the thirty-five participants, may be indicated.

[Courses to be Played in Competitive Game]

Here, the courses to be played in the competitive mode will be described. Unlike the case of the single-player mode described above, in the competitive mode, one large course (hereinafter, referred to as connected course) created by connecting courses selected by the respective participants before the start of the game is to be played. That is, each participant plays the jump action game using the same course that is the connected course.

The outline of the flow of generation for the connected course will be described. First, when the competitive mode is started, entries of participants are accepted. At this time, a screen for selecting a course desired to be played is presented to each participant. Each player selects one of the presented courses. The resultant information is transmitted to the server 101, and the server 101 executes processing of creating one connected course by connecting the courses selected by the respective participants in a certain order. Regarding the order, in the exemplary embodiment, the courses are connected in the order from the course selected by a player whose cumulative number of coins acquired through plays of the competitive games thus far is smallest (acquisition of coins will be described later). In the exemplary embodiment, since there are thirty-five participants, thirty-five courses are eventually connected to generate one large connected course. It is noted that, when the goal point of each course is reached, the game automatically shifts to the next course.

An example of generation of the connected course will be described. For convenience of description, five players A to E out of thirty-five players are picked out in the order from the one having the smallest cumulative number of coins. For example, the courses selected by these players are assumed such that the player A selects a course 1, the player B selects a course 2, the player C selects a course 1, the player D selects a course 4, and the player E selects a course 3. In this case, the courses are connected in the order of "course 1", "course 2", "course 1", "course 4", "course 3", . . . , to generate one connected course.

Regarding the screen for selecting the courses, in the exemplary embodiment, the contents of selectable courses presented to each participant can differ among the participants. In the exemplary embodiment, the contents of the courses to be presented are determined on the basis of the play history of each participant. Specifically, courses cleared in the single-player mode and a course of the smallest course number (i.e., a course to be challenged for clearing at the present) among the courses not cleared, are presented as selectable courses. As an example, it is assumed that the player A has already cleared the courses 1 to 5 but has not cleared the course 6 yet. In addition, it is assumed that the player B has not cleared even the course 1 yet. In this case, as selectable courses described above, the courses 1 to 6 are presented to the player A and only the course 1 is presented to the player B.

As described above, selectable courses that differ among the participants are presented on the basis of the play history of each participant. Further, the selected courses are connected in the order from the one selected by the player whose cumulative number of acquired coins is the smallest, to generate the connected course. Here, the player whose cumulative number of acquired coins is small is assumed to be a beginner player who has not much played the game. In addition, it is considered that courses of small course numbers have less difficulty levels than later courses. Accordingly, the connected course generated as described above is formed such that a course selected by a beginner player appears earlier, and as a result, it is expected that the courses are connected approximately in the order from lower difficulty levels. Thus, even in a case where beginners participate in the competitive game, they can advance the games to a certain extent and are allowed to enjoy the competitive game.

In another exemplary embodiment, the courses to be played in the competitive game may be determined in a lottery manner, instead of being selected by the participants. Also in this case, all the participants are to play the courses determined by the lottery.

[Timing of Starting to Play in Competitive Mode]

When the connected course is created as described above, data indicating the connected course is distributed from the server 101 to the game systems 1 of the respective participants, to make preparation for starting competitive plays using the connected course. Then, with synchronization established among all the participants, a countdown indication is displayed and all the participants start to play substantially at the same timing and from the same start point in the same connected course. In other words, in the exemplary embodiment, the jump action game to be played by each participant is processed as an independent game in the individual participant's information processing system 1, while the start timings for the processes are synchronized among the participants. It is noted that the wording "substantially at the same timing" includes not only a case where the timings are exactly the same, but also a case where the games are considered to be started at "the same timing" though there are slight time differences due to network delay, slight time lags, and the like. In the exemplary embodiment, at the same time as the countdown is finished, the player object 201 appears at a predetermined start point (a position at which the player object 201 is present in FIG. 6) which is the same among all the participants, and thus is allowed to be operated.

In the exemplary embodiment, for convenience of description, it is assumed that thirty-five players participate, i.e., all the thirty-five players are humans, as an example. In a case where the number of the participants is less than thirty-five, AI players on the server side may compensate for the deficiency. Then, processing as described below may be performed as appropriate on the server 101 side. In another exemplary embodiment, the competitive game may be started as it is without particularly compensating for the deficiency by the server 101. For example, in a case where there are only twenty participants, the competitive game may be performed with only the twenty participants.

When the competitive game for the connected course is started, each participant in the competitive game operates the own player object 201 to advance the jump action game. Therefore, basically, each player plays the jump action game with such a sense as to play a single-player game, but at the same time, in the exemplary embodiment, a competitive feature as described below is adopted. Thus, while a sense of playing a single-player game is provided, the game is also established as a competitive game. Hereinafter, the competitive feature in the exemplary embodiment will be described.

[Transmission of Assassin to Opponent]

First, in the exemplary embodiment, (substantially) the same enemy object 202 as the enemy object 202 defeated in the jump action game can be sent in to a predetermined opponent set as a "target" described later. Here, the wording "same enemy object" means not only the enemy object having the same name and/or outer appearance, but also the enemy object of the same "kind". The enemy object that has been sent in appears as an enemy object 202 in the jump action game for the corresponding opponent (hereinafter, simply referred to as "opponent's game"). To be exact, the enemy object that has been sent in is placed at a predetermined position in the connected course in the opponent's game and appears on the screen at an appropriate timing (the way of determining the placement position will be described later). Hereinafter, the enemy object that is sent in to the opponent is referred to as "assassin". Meanwhile, the other enemy objects, i.e., the enemy objects placed in the connected course from the beginning, are referred to as "default enemies". It is noted that the initial placement positions of the default enemies in the connected course are the same among the players.

As described above, the assassin that has been sent in is to appear in the opponent's game. Then, if the player object 201 operated by the opponent, for example, comes into contact with the assassin and thus is defeated and ends up game over, the possessed coins and the remaining time limit of the opponent at that point of time can be acquired. In other words, in a case where the opponent loses a life to end up game over because of the assassin sent in by the player, the player can acquire the coins and the time limit of the opponent. That is, the player can perform a kind of attack against the opponent in a manner of "sending in an assassin". In addition, since the "same" enemy object as the defeated enemy object is sent in as described above, if the player has successfully defeated a "stronger" enemy object, the player can have a higher expectation for leading the opponent to game over.

In contrast to the above, there can be a case where an assassin is sent in to the player from a predetermined opponent. In this case, if the player loses a life to end up game over because of the assassin from the opponent, the possessed coins and the remaining time limit of the player at that time are given to the opponent who sent in the assassin. For example, it is assumed that an assassin A and an assassin B are sent in from an opponent A and an opponent B, respectively. In this case, if the player loses a life due to contact or the like with the assassin A to end up game over, the possessed coins that have been acquired through this competitive game and the remaining time limit at that time are given to the opponent A. On the other hand, if the player ends up game over because of the assassin B, the possessed coins and the time limit are given to the opponent B.

In the exemplary embodiment, if the player defeats an assassin sent in from an opponent, it is possible to further send the assassin to another opponent. For example, it is assumed that the assassin B is sent in from the player B to the player A. In addition, it is assumed that the player A has set the player C as a "target" at that time. In this case, if the player A defeats the assassin B, the assassin B (the same enemy object as this) can be sent in to the game of the player C.

Figure 8:
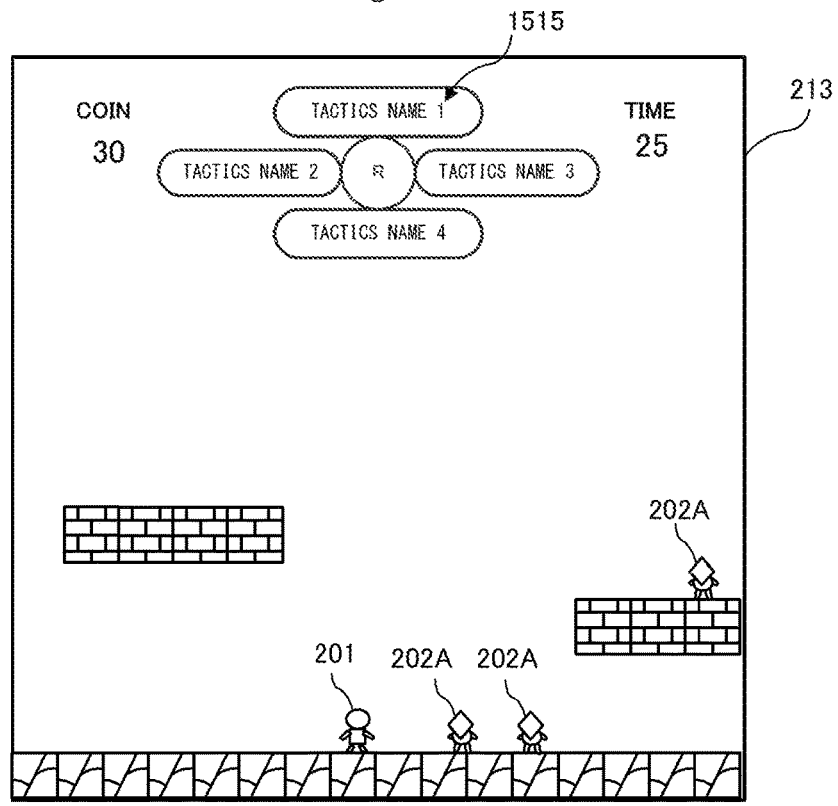
FIG. 8 shows a non-limiting example of a game image displayed in the action game area 213.
Figure 9:
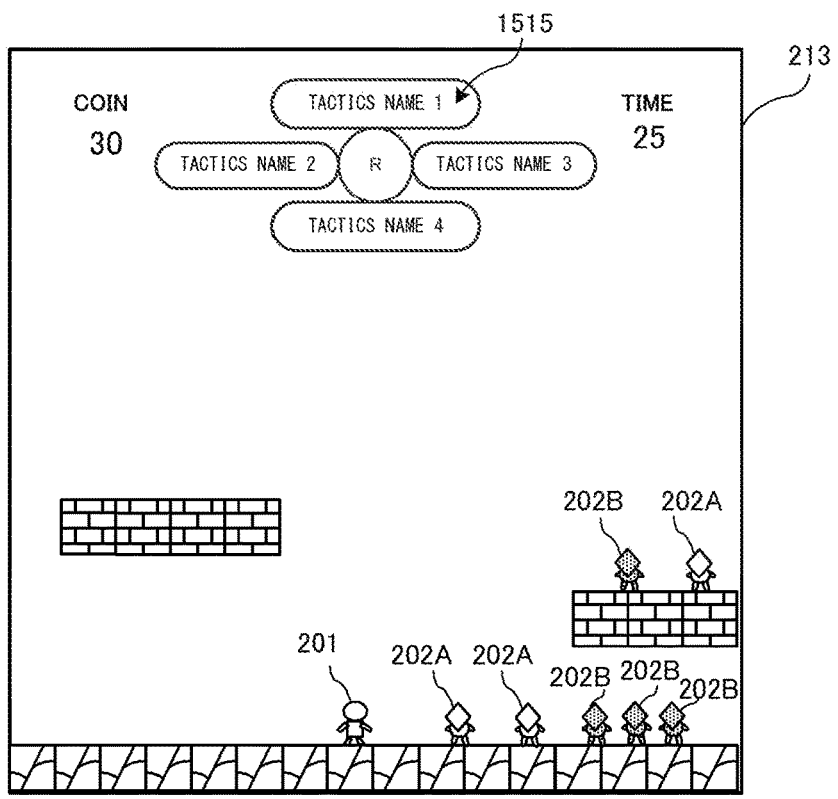
FIG. 9 shows a non-limiting example of a game image displayed in the action game area 213.

It is noted that such an assassin is displayed on the game screen in a display manner different from the default enemy. FIG. 8 shows an example of a game screen in a case where there are no assassins, and FIG. 9 shows an example of a game screen in a case where there are assassins in the same scene. In FIG. 8, the player object 201 and three default enemies 202A are present in the screen. Of the three default enemies 202, two are present on the right side of the player object 201, and one is present on a block at the upper right. On the other hand, in FIG. 9, three default enemies 202 and in addition, four assassins 202B, are present in the same scene as FIG. 8. As shown in FIG. 9, the display manner of each assassin 202B is different from that of the default enemy 202A (in FIG. 9, half-tone dot meshing display). This allows the player to easily recognize which is the default enemy 202A and which is the assassin 202B, of the appearing enemy objects 202. Owing to such recognition, the player can also play in such a style as to place importance on avoiding the assassins without daring to attack them, for example. That is, it becomes possible to do such a play as to avoid a risk of giving the possessed coins and the time limit to opponents, whereby variations in strategies and play styles of the game can be increased.

[Placement Position of Assassin]

Here, a method (hereinafter, placement rule) for determining a placement position of the above-described assassin when the assassin is sent in to an opponent's game, will be described. In the jump action game of the exemplary embodiment, various kinds of enemy objects 202 appear. In the exemplary embodiment, these enemy objects are classified into two groups, i.e., group A and group B, and the placement rule differs between both groups. In the exemplary embodiment, it is assumed that the enemy objects belonging to the group B have action routines that are more special than those of the enemy objects belonging to the group A. For example, the group B includes such enemy objects that move without being subjected to collision detection with terrains or the like. Further, the enemy objects belonging to the group B may have individual placement rules different from each other.

First, a placement rule in a case where an enemy object belonging to the group A is sent in as an assassin, will be described. In this case, in principle, the assassin is placed at such a position that satisfies all the following conditions.

The position is in a range between a position that is one screen ahead of the present position, and the goal point.

A "platform" such as a ground or a block is present just under the position.

The position does not overlap any block or other enemy objects.

Among such positions that satisfy the above conditions, each assassin is placed from a position closer to the present position of the player object 201 to which the assassin is sent in, in the order in which the assassin is sent in (the order in which each player has successfully attacked the source enemy object for the assassin). Regarding specific placement positions of assassins, in another exemplary embodiment, the placement positions may be randomly determined while satisfying the above conditions.

In a case where it is impossible to place the assassin in the course being played at present, the assassin is to be placed in the next course. At this time, the behavior of the assassin may be changed in accordance with the environment of the course in which the assassin is to be placed. For example, it is assumed that the enemy object 202 that normally appears in a plain ground course and moves with a walking motion on the ground is placed as an assassin in a course with a motif of underwater. In this case, when the assassin appears in the screen, the assassin may be moved with a swimming motion.

Next, a placement rule in a case where an enemy object belonging to the group B is sent in as an assassin, will be described. In the group B, while the rule of the group A is used as a base, individual placement rules are set for the respective enemy characters belonging thereto. As an example, placement rules individually set for four kinds of enemy characters, i.e., enemy characters A to D, will be described. First, in the case of the enemy character A, the enemy character A can be placed even at such a position that overlaps a block as long as the position allows contact with the ground. In the case of the enemy character B, a predetermined position in the horizontal-axis direction on the game screen is determined in accordance with the placement rule of the group A. This position is set as an "appearance trigger position", and when the player object 201 passes this position, the enemy character B appears from a random position in a lower part of the screen. Next, in the case of the enemy character C, an appearance trigger position is determined in the same manner as for the enemy character B. Then, when the player object 201 passes this position, the enemy object C appears from any position at the right end of the screen. Finally, in the case of the enemy character D, the enemy character D can be placed even at a position where there is no "platform" such as a ground or block just under the position, and further, can be placed even at a position that does not overlap blocks.

As described above, in the exemplary embodiment, assassins are placed one after another at predetermined positions that are on the advancing-direction side with respect to the present position of the player object and that do not make it impossible to advance the game. Therefore, depending on the number of assassins sent in, there can be a case where enemy objects (assassins) appear in a number that is several times the number of enemy objects appearing in the single-play mode. Thus, the player can enjoy game development unpredictable for the player, unlike the case of the single-play mode.

[Pre-Notice Area]

Figure 10:
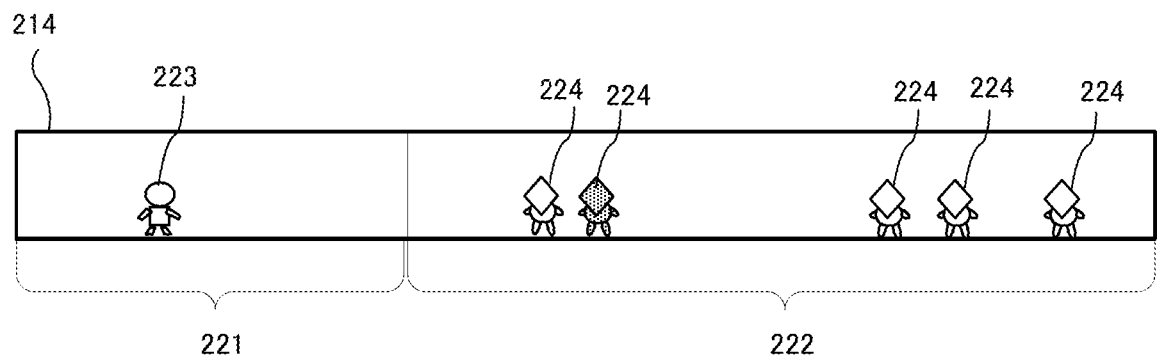
FIG. 10 illustrates a non-limiting example of a pre-notice area 214.

Next, the pre-notice area 214 shown in FIG. 6 will be described. This pre-notice area is an area for allowing the player to visually recognize, to a certain extent, the distance between the player object 201 (present position thereof) and each of the assassins and the default enemies described above, and the positional relationship therebetween is simply displayed in this area. FIG. 10 is an enlarged view of the pre-notice area 214. In FIG. 10, the pre-notice area 214 has two areas of a present screen field 221 and a frontward field 222. The present screen field 221 is a field corresponding to a range in the virtual game space that is displayed in the action game area 213 at present. The frontward field 222 is a field corresponding to a frontward range up to two screens ahead. In the present screen field 221, a mini player image 223 corresponding to the player object 201 is displayed. Meanwhile, in the frontward field 222, five mini enemy images 224 are displayed in FIG. 10. In the example in FIG. 10, it can be recognized that two enemy objects 202 are present in a range up to about one screen ahead, and three enemy objects 202 are present in a range further one screen ahead thereof. The mini enemy images 224 are also displayed in display manners different between default enemies and assassins as described above. Then, in accordance with the distances between the placement positions of the player object 201 and the enemy objects 202, the positions of the mini enemy images 224 are moved (namely, the display position of the mini player image 223 is fixed), whereby the positional relationship therebetween is simply displayed. Then, when the enemy object 202 corresponding to each mini enemy image 223 comes to be displayed in the screen (i.e., comes to be visible in the action game area 213), the mini enemy image 224 is deleted from the frontward field 222.

Figure 11:
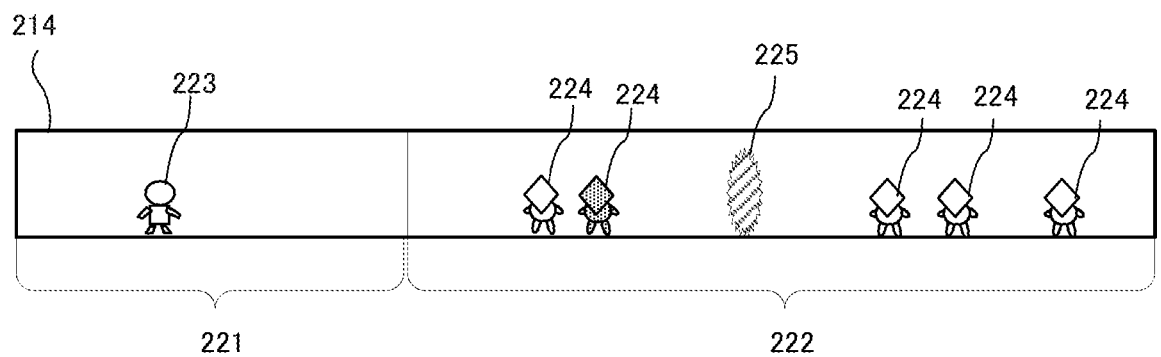
FIG. 11 illustrates a non-limiting example of the pre-notice area 214.
Figure 12:
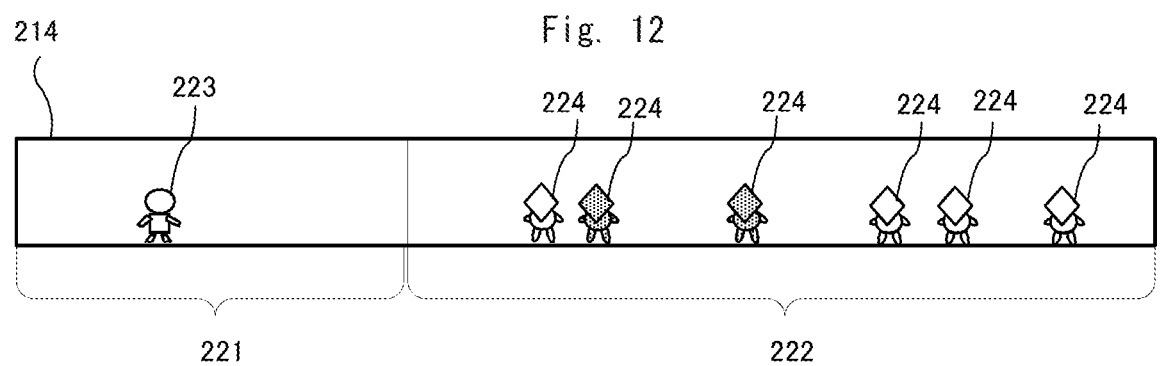
FIG. 12 illustrates a non-limiting example of the pre-notice area 214.

In addition, when an assassin is newly placed in the range displayed in the pre-notice area 214, a representation that enables recognition thereof is also performed. FIG. 11 and FIG. 12 show examples of screens involving such representations. First, when an assassin is newly placed in a virtual game space range corresponding to the pre-notice area 214, an appearance effect 225 as shown in FIG. 11 is displayed. Thereafter, as shown in FIG. 12, the mini enemy image 224 corresponding to the assassin is displayed at that position. Thus, the player can recognize almost in real time that an enemy is newly placed.

[Setting for Target]

Figure 13:
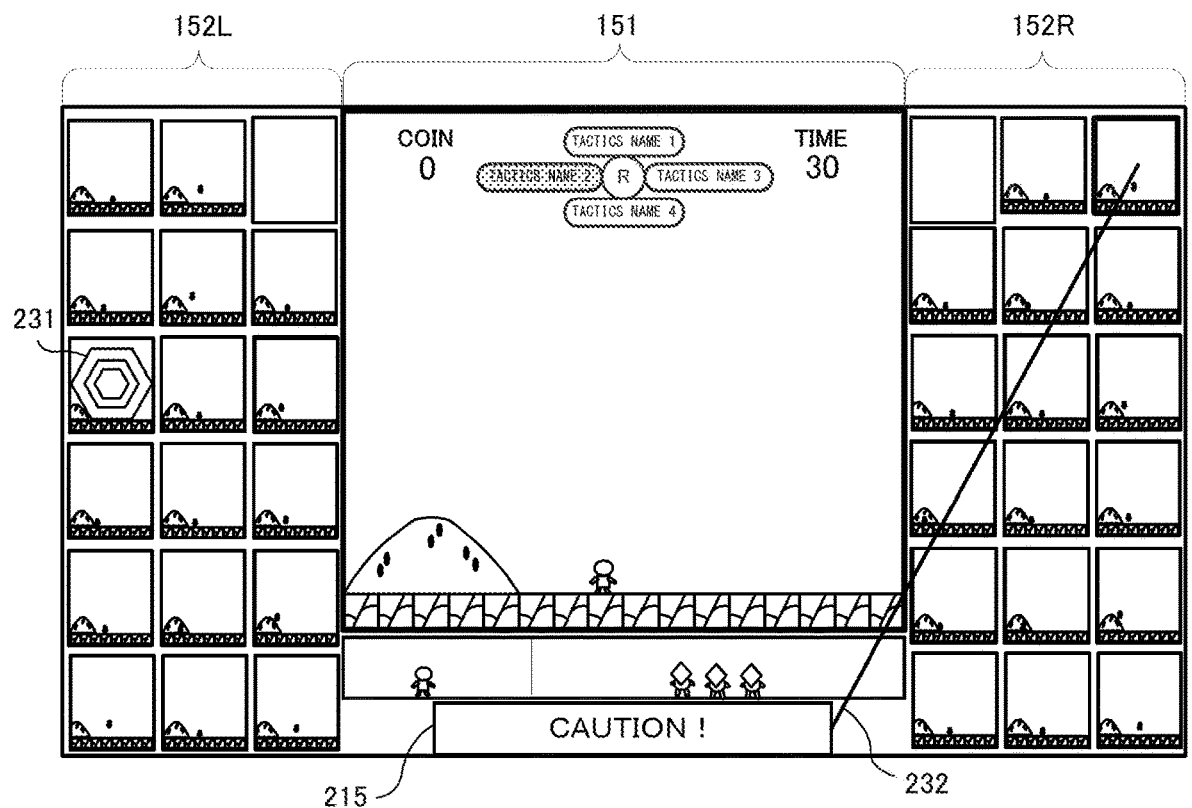
FIG. 13 shows a non-limiting example of a game image according to the exemplary embodiment.

Next, the "target" mentioned above will be described. In the exemplary embodiment, the assassin is sent in to an opponent set as the "target". The "target" is set in accordance with the "tactics" described later, by the processor 81. In the exemplary embodiment, in principle, only one opponent can be set as the "target". In some kinds of "tactics", a plurality of opponents can be set as the "targets". On the opponent image for the opponent set as the "target", a target image 231 is displayed in a superimposed manner as shown in FIG. 13. Thus, the player can easily recognize which opponent is set as the "target".

Next, display of a game image in a case where the player him/herself is set as the "target" by any of the opponents will be described. In this case, a character string "CAUTION" is displayed in the warning area 215, as shown in FIG. 13. Further, a line 232 is displayed so as to connect the warning area 215 and an opponent image (center point thereof) for the opponent who sets the player as the "target". In addition, the opponent image for the opponent who sets the player as the "target" is displayed with the display manner changed so as to be enclosed by a thick frame. In the example in FIG. 13, it is indicated that the opponent corresponding to the right end uppermost area of the second area 212R sets the player as the "target". By performing display as described above, it becomes easy for the player to recognize the fact that the player him/herself is set as the "target", in particular, in a game in which multiple opponents are present as assumed in the exemplary embodiment. For example, it becomes possible to easily recognize which opponent sets the player as a "target", how many opponents set the player as a "target", and the like. The method for indicating a state of being set as a "target" is not limited to image display using the warning area 215 and the line 232 as in this example. Any image and display manner may be used as long as the purpose of enabling recognition of the fact that the opponent sets the player as a "target" can be achieved.

The opponent to be set as a target or the opponent who sets the player as a target vary from moment to moment in accordance with the "tactics" described above. Therefore, even if the "tactics" is not changed, the display positions of the target image 231 and the line 232 can vary.

[Tactics]

Next, the aforementioned tactics will be described. In the competitive game according to the exemplary embodiment, the tactics is used as a policy for determining a "target" from among the opponents who have not ended up game over yet. First, the significance of the tactics will be described. In this game, competition is performed by a large number of players constituted of thirty-five players, and thus thirty-four opponents are present other than the individual player. In addition, in this game, it is necessary to select the "target" as described above. As a method for selecting the "target", for example, it is conceivable that the user directly performs an operation of selecting any one of a total of thirty-four opponent images displayed in the second areas 152. However, in the jump action game like this game, the operation is required to be performed in real time to a certain extent. Therefore, it is considered to be difficult to contemplate which opponent is to be set as the "target" among a large number of opponents and perform a selecting operation while performing an operation for the player object 201 in parallel. Accordingly, in the exemplary embodiment, the tactics as policies for selecting the "target" are presented to the user, so that the player can select the tactics through a simple operation that can be performed in parallel with the operation for the player object 201. Then, in actual selection of the "target", the processor 81 executes processing of selecting a predetermined opponent on the basis of the tactics that is being selected, and setting the opponent as the "target".

Next, examples of the tactics defined in advance in the exemplary embodiment will be described. In this game, the following four tactics are presented to the user so as to be selectable. It is noted that character strings representing the tactics names are displayed on the option images in the tactics operation panel 217 shown in FIG. 7.

Tactics 1: aiming at opponent in pinch
Tactics 2: random
Tactics 3: aiming at coins
Tactics 4: counterattack
Hereinafter, each tactics will be described.

[Tactics 1: Aiming at Opponent in Pinch]

This tactics is a tactics with a policy of setting an opponent who has the least time limit remaining, as a "target". That is, this can be said to be a tactics of aiming at an opponent who can be easily led to game over. It is noted that, in a case where there are a plurality of opponents having the same time limit remaining, one of them may be randomly selected.

[Tactics 2: Random]

This tactics is a tactics of randomly selecting one of the opponents who have not ended up game over yet, so as to be set as a "target". In the exemplary embodiment, this tactics is selected as a default at the start of the game.

[Tactics 3: Aiming at Coins]

This tactics is a tactics of setting an opponent of which the number of possessed coins is largest among the opponents who have not ended up game over yet, as a "target". When the assassin sent in by the player has led the opponent to game over, the player can acquire the possessed coin of the opponent. Therefore, this tactics is effective in a case of desiring to aggressively increase the number of possessed coins.

[Tactics 4: Counterattack]

This tactics is a tactics of setting, as a "target", an opponent who sets the player as a "target". In addition, if there are a plurality of opponents who set the player as a "target", all these opponents are set as "targets". As described above, in this game, the number of "targets" is one in principle, but in the "counterattack" tactics, a plurality of "targets" can be set. Therefore, in this case, a plurality of target images 231 as shown in FIG. 13 can also be displayed at the same time. In addition, in a state in which the "counterattack" tactics is selected, if the number of opponents who set the player as a "target" changes, the opponents to be set as "targets" and the display positions of the target images 231 are also changed accordingly, as appropriate.

The "tactics" are not limited to the above ones, and in another exemplary embodiment, "tactics" with other selection policies may be presented to the player so as to be selectable.

In still another exemplary embodiment, an operation method of setting a target by designating the "tactics" as described above, and an operation method in which the player directly designates a "target", may be allowed to be used in combination. Thus, the "target" can be determined semi-automatically through an operation of selecting the "tactics" (policy for determining "target"), and also, the player can directly determine the opponent to be a "target", thereby allowing the player's intention to be readily reflected in determining the "target".

In this way, the competitive game advances while the participants send in assassins to each other. Then, when a player has ended up game over because of an assassin, the possessed coin and the remaining time limit thereof are given to a player who has sent in the assassin. Here, supplementary description will be given regarding a case of ending up game over not due to an assassin. Examples of such cases include a case where the player object 201 falls into a "hole" present in the connected course, a case of ending up game over because of contact with a default enemy, and a case where the time limit reaches zero. In such a case, for example, while assassins are sent in to the player A from opponents, if the player A has ended up game over not due to the assassins, the possessed coin and the remaining time limit may be given to the last opponent player who has sent in the assassin. On the other hand, if the player A has ended up game over in a state in which no assassins are sent in from opponents, the possessed coins and the time limit of the player A may not be given to another player. In another exemplary embodiment, in a case where the player A has ended up game over not due to an assassin, the possessed coins and the time limit of the player A may not be given to another player, irrespective of presence/absence of an assassin from an opponent. Further, in this case, the possessed coins of the player A (and other players who have ended up game over for similar reasons not due to an assassin) may be pooled and the pooled possessed coins may be given to the player who has won first place eventually.

[What User Can Do After Game Over]

Next, processing in a case of ending up game over will be described. As described above, this competitive game is a game of trying to "become the last surviving player". If the player ends up game over before achieving the above purpose, the player can end the game and end display of the game image. Meanwhile, it is also possible to continue to "watch" the competition among the opponents. For example, when the player has ended up game over, the player is asked whether or not to watch the game after this. Then, if the user chooses to watch the game, the game image continues to be displayed until the competitive game played at this time finishes (until the last surviving player is determined). In this case, in the first area 211, the state at the time of game over continues to be displayed, and in the second areas 212, the display contents vary in accordance with the subsequent advancement of the competitive game. That is, for an opponent who has not ended up game over yet, an image representing the game state thereof continues to be displayed. For an opponent who has ended up game over, for example, characters "KO" are displayed. Further, a relative evaluation between the opponent and the other players is also displayed. In the exemplary embodiment, as an example of the relative evaluation, a numerical value indicating the ranking of the opponent (the ranking at the time of ending up game over) is displayed as an opponent image. In addition, for an opponent who is watching after game over as described above, for example, characters "WATCH" are displayed in addition to the characters "KO". In this way, in a case where an opponent has ended up game over, an image indicating this fact, and the ranking thereof, are displayed in the second area 212. In addition, in a case where the opponent who has ended up game over chooses to watch the game, an indication for this fact is also displayed. Thus, it becomes easy to recognize which opponent has ended up game over and which opponent is watching after game over.

While the competitive game advances as described above, if the last surviving player is determined, a condition for ending the competitive game is satisfied. Then, advancement of the game is stopped, and a result screen (not shown) indicating the final rankings of the players is displayed. Thereafter, the competitive game is ended.

As described above, in the exemplary embodiment, in the competitive mode, while each player plays a jump action game with a sense of playing a single-player game, a feature as a competitive game is also incorporated by sending in assassins to each other. Thus, an unprecedented novel game that allows a player to enjoy competition by a single-player game, is provided.

[Details of Game Process in Exemplary Embodiment]

Next, with reference to FIG. 14 to FIG. 27, the game process according to the exemplary embodiment will be described in more detail. Here, the game process for the above competitive mode will be mainly described, and description of other game processes for the "single-play mode" and the like is omitted.

[Used Data]

Figure 14:
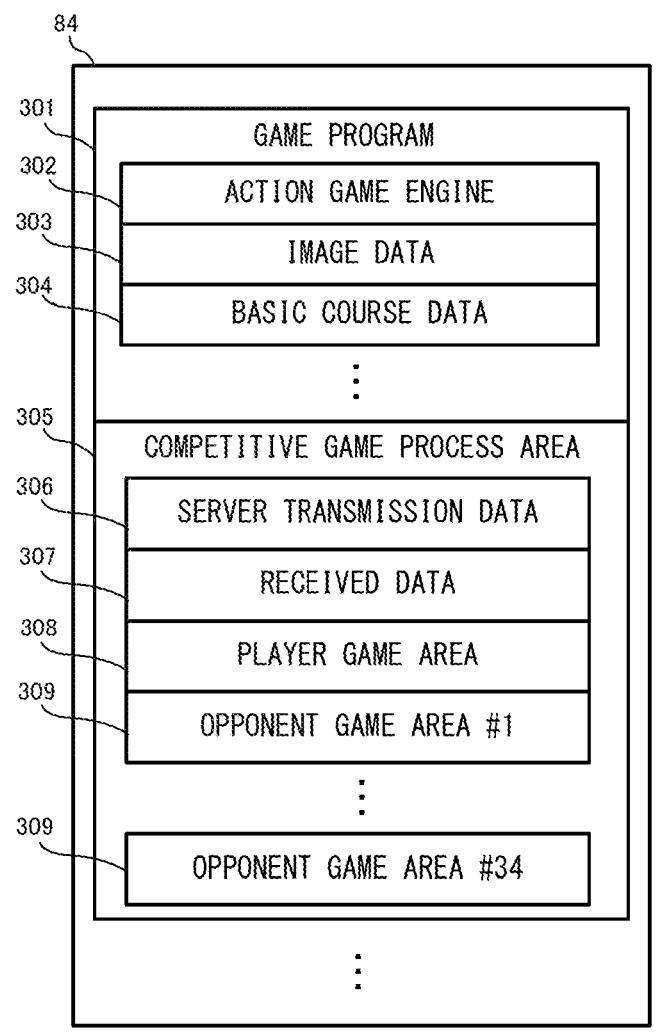
FIG. 14 is a memory map showing a non-limiting example of various types of data stored in a storage section 84 of the body apparatus 2.

First, various types of data to be used in this game process will be described. FIG. 14 is a memory map showing an example of various types of data stored in the storage section 84 of the body apparatus 2. The storage section 84 of the body apparatus 2 stores a game program 301. In addition, the storage section 84 includes a competitive game process area 305 for storing various data to be used in the competitive game process.

The game program 301 is a program for controlling the game process according to the exemplary embodiment, and includes an action game engine 302, image data 303, basic course data 304, and the like. The action game engine 302 is a collection of game programs for implementing the above-described jump action game part of the entire competitive game, and is a collective term for referring to the collection of programs, for convenience of description. In the exemplary embodiment, a process using the action game engine 302 is executed, whereby the above-described jump action game is implemented. The image data 303 is data of various images for the jump action game. The basic course data 304 is data representing the structures of the above-described courses in the jump action game. Specifically, this data includes, for each course, information such as arrangements of various terrain objects and the like forming the course, placement positions of default enemies appearing in the course, and the placement positions of coins. In execution of the action game engine 302, processing is performed using the image data, the basic course data, and the like, whereby the process of the jump action game as described above is executed. Then, a game image in which the processing result is reflected (i.e., an image to be displayed in the action game area 213 and the second areas 212) is generated.

In the exemplary embodiment, thirty-five action game engines as described above are operated in parallel in one game apparatus. That is, independent jump action game processes for thirty-five persons are executed in one game apparatus. One of these processes is allocated for the player and the other thirty-four processes are allocated for the opponents. Then, in the processes for the jump action games corresponding to the thirty-four opponents, operation data is received from each opponent and processing is performed using this, whereby the game process for the opponent is reproduced. Then, processing such as displaying the resultant game image in the second area 212 is performed, whereby the competitive game process is advanced. On the basis of the operation data from the participants, the jump action game processes are performed using the same action game engines 302, and as a result, the same game development is realized in each game apparatus of the competitive game participants.

In the competitive game process area 305, various data to be used in the competitive game process according to the exemplary embodiment are stored. Specifically, server transmission data 306, received data 307, a player game area 308, and thirty-four opponent game areas 309 are included.

Figure 15:
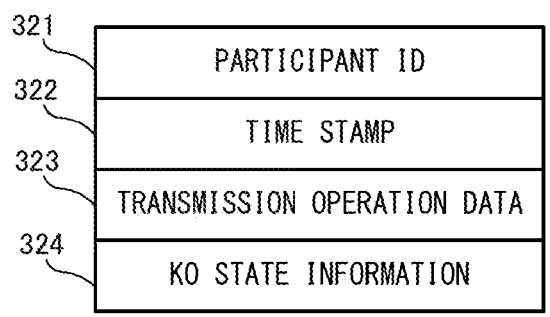
FIG. 15 shows a non-limiting example of the structure of server transmission data 306.

The server transmission data 306 is data of the game state of the player to be transmitted to the server 101. The data is eventually transmitted to each opponent via the server 101. FIG. 15 shows an example of the data structure of the server transmission data 306. In FIG. 15, the server transmission data 306 includes at least a participant ID 321, a time stamp 322, transmission operation data 323, and KO state information 324. The participant ID 321 is an ID for uniquely identifying each participant. In the exemplary embodiment, at the time of starting the competitive game (e.g., after acceptance for participants is finished), the participant IDs 321 are assigned to the respective participants. The time stamp 322 is data indicating the date and time at which the server transmission data has been transmitted. In other words, the time stamp 322 is data indicating the date and time at which an operation corresponding to operation data described below has been performed, and is used also for determining the order in which assassins have been sent in among a plurality of participants. The transmission operation data 323 is data indicating the content of a player's operation, and is data copied from operation data 333 described later. The KO state information 324 is information to be used for recognizing whether or not each participant has ended up game over, on the server 101 side.

The received data 307 is data received from the server 101 and indicating the opponent's game states. This data includes thirty-four sets of the above server transmission data 306 (i.e., server transmission data 306 of thirty-four opponents).

Figure 16:
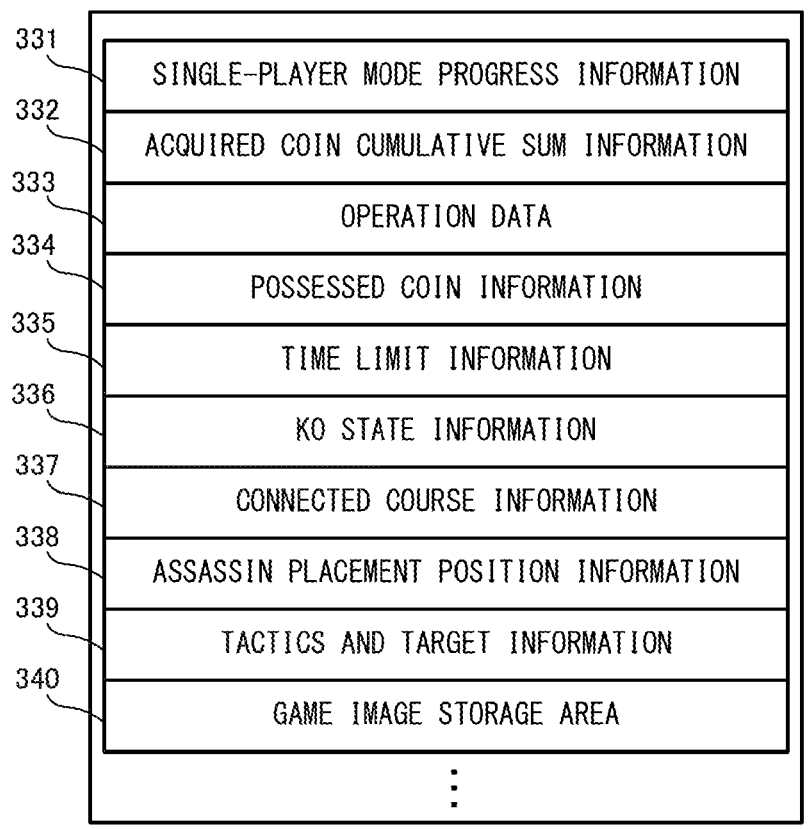
FIG. 16 shows a non-limiting example of data stored in a player game area 308.

With reference to FIG. 14 again, the player game area 308 is an area for storing various data for performing the process of the jump action game to be played by the player. FIG. 16 shows an example of data stored in the player game area 308. The player game area 308 includes single-player mode progress information 331, acquired coin cumulative sum information 332, operation data 333, possessed coin information 334, time limit information 335, KO state information 336, connected course information 337, assassin placement position information 338, tactics and target information 339, a game image storage area 340, and the like.

The single-player mode progress information 331 is information indicating to what extent the player progresses in the game in the single-player mode. In other words, the single-player mode progress information 331 is information indicating how far the player has cleared the courses in the single-player mode. This information is used for determining courses to be presented to each player when generating the connected course.

The acquired coin cumulative sum information 332 is information indicating the cumulative number of acquired coins through the competitive plays that have been done by the player thus far. For example, in a case where the player has done competitive plays three times in the past, the cumulative number of coins that have been acquired as a result of the past three competitive plays is indicated. This information is used for generating the connected course.

The single-player mode progress information 331 and the acquired coin cumulative sum information 332 may be stored as saved data in the server 101. That is, saved data indicating the play statuses of each player including those for the single-player mode and the competitive mode may be stored in the server (cloud saving), and the saved data may be acquired as necessary. As a matter of course, the saved data may be stored in the game apparatus.

Next, the operation data 333 is data obtained from the left controller 3 and the right controller 4, and indicates the content of a player's operation. The operation data 333 includes digital button data indicating the depression states of the buttons provided to each controller, analog stick data indicating the content of an operation on the analog stick, and the like.

The possessed coin information 334 is information indicating the number of possessed coins acquired in the competitive game performed at this time. The number of possessed coins is initially zero at the start of the competitive game, and then increases or decreases in accordance with game development.

The time limit information 335 is information indicating the time limit described above, and the value thereof also increases or decreases in accordance with game development.

The KO state information 336 is information indicating whether or not the player has ended up game over. Also, the KO state information 336 indicates whether or not the player is watching after game over. As the KO state information 336, information indicating a state in which the player has ended up game over or a state in which the player has not ended up game over yet, is set. The initial value is the latter state.

The connected course information 337 is information indicating the configuration of the connected course as described above. In the exemplary embodiment, information (course 1, course 2, etc.) indicating thirty-five courses is stored in the order in which each course appears in the connected course.

The assassin placement position information 338 is information indicating a placement position/appearing position of an assassin from an opponent, in the jump action game for the player. That is, the assassin placement position information 338 is information indicating at which position an assassin from an opponent is placed in the connected course. For example, position information in the connected course and information about an assassin placed at the position (information indicating the source player who has sent in the assassin, the kind of the corresponding enemy, and the like), are included in association with each other.

The tactics and target information 339 is information about the "tactics" and the "target" as described above. Specifically, the tactics and target information 339 includes information indicating the "tactics" selected at present and information for specifying an opponent set as the "target" on the basis of the tactics.

The game image storage area 340 is a kind of framebuffer for temporarily storing images of the jump action game for the player. The images stored here are sequentially displayed at one-frame cycle (e.g., a cycle of $\frac{1}{60}$ second) in the action game area 213 shown in FIG. 6.

Besides, in the player game area 308, various data to be used in the jump action game for the player are also stored as appropriate, although not shown.

Figure 17:
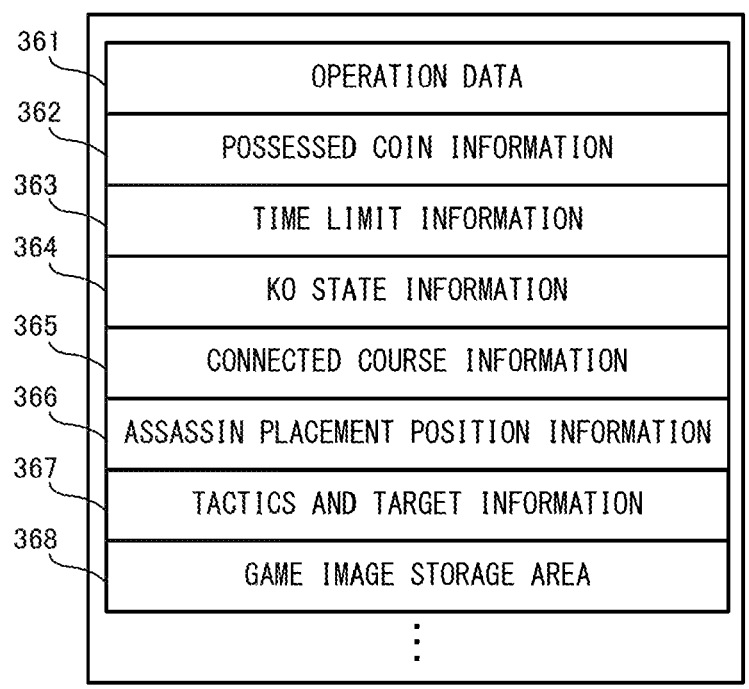
FIG. 17 shows a non-limiting example of data stored in an opponent game area 309.

With reference to FIG. 14 again, next, the opponent game area 309 is an area for performing a process of the jump action game for each opponent, and opponent game areas 309 for thirty-four opponents are prepared individually. FIG. 17 shows an example of data stored in the opponent game area 309 for one opponent. In FIG. 17, operation data 361, possessed coin information 362, time limit information 363, KO state information 364, connected course information 365, assassin placement position information 366, tactics and target information 367, a game image storage area 368, and the like are stored. These data are basically the same as the operation data 333 to game image storage area 340 described with reference to FIG. 16. Therefore, the detailed description thereof is omitted. In the exemplary embodiment, the content of the operation data of each opponent acquired via the server 101 is set in the operation data 361 of the opponent game area 309. Then, on the basis of the operation data 361, the processor 81 performs action control on the player object 201 (of the opponent), and on the basis of the result thereof, the jump action game process is performed and other data contents such as the possessed coin information 362 are updated as appropriate. Thus, the opponent's game development and game state are reproduced in the game system 1 of the player.

[Data Stored in Server]

Figure 18:
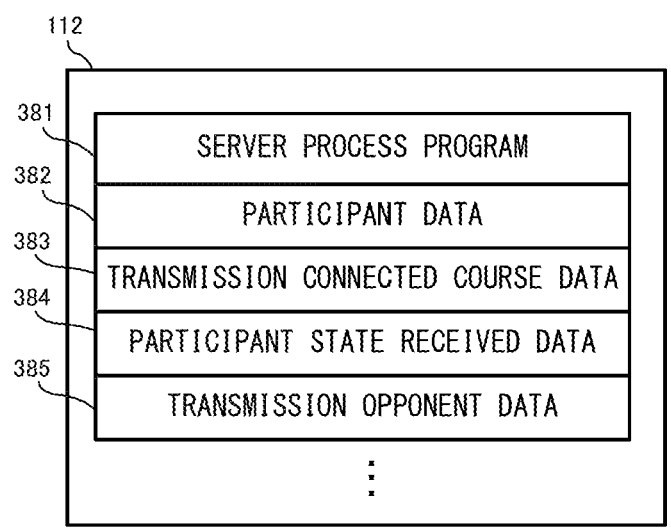
FIG. 18 is a memory map showing a non-limiting example of various types of data stored in a storage section 112 of the server 101.

Next, data used in the server 101 will be described. FIG. 18 is a memory map showing an example of various types of data stored in the storage section 112 of the server 101. The storage section 112 of the server 101 stores a server process program 381, participant data 382, transmission connected course data 383, participant state received data 384, transmission opponent data 385, and the like.

The server process program 381 is a program for implementing a function to be executed by the server 101 in the game process according to the exemplary embodiment. Main processes to be executed by this program are a process for receiving the server transmission data 306 transmitted from each game system 1, a process for advancing a game by an AI user if AI user processing is needed, a process for generating data to be transmitted to each game system 1 and transmitting the data, a process for managing the advancement status of the competitive game, and the like.

The participant data 382 is data for specifying the players who participate in the competitive game (thirty-five players at maximum) according to the exemplary embodiment. For example, the player ID and the like of each player are stored. In addition, information about advancement control for the competitive game is also stored as appropriate. This information includes, for example, information about whether or not each player has ended up game over, information indicating the present ranking of each player, and the like.

The transmission connected course data 383 is data indicating the configuration of the connected course generated at the start of the competitive game, and is to be transmitted to the game systems 1 of the respective participants.

As the participant state received data 384, the server transmission data 306 transmitted from each game system 1 is temporarily stored. On the basis of this data, the transmission opponent data 385 is generated or updated.

The transmission opponent data 385 is data of the opponent's states to be transmitted to each game system 1. In the exemplary embodiment, operation data of the respective players are mainly transmitted as described above. The data configuration varies in accordance with the transmission destination, and includes server transmission data 306 for thirty-four players other than data of the player corresponding to the game system 1 at the transmission destination.

[Entire Processing Flow]

Figure 19:
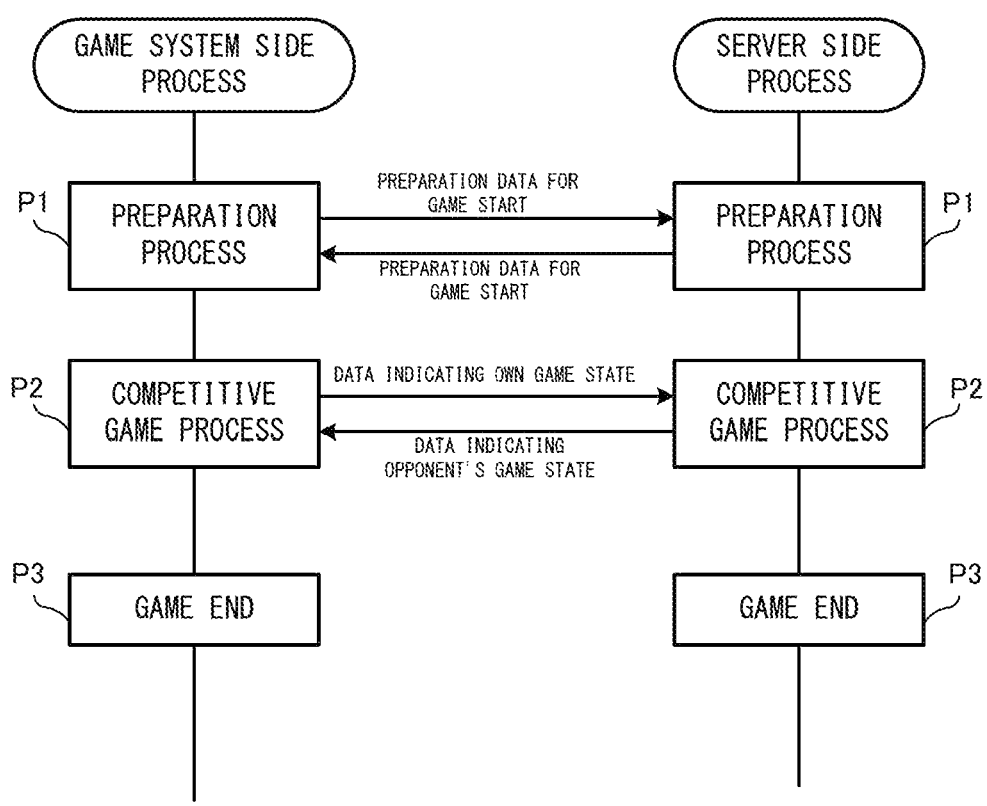
FIG. 19 shows an entire processing flow based on cooperation between the server 101 and each game system 1.

Next, the details of the competitive game process according to the exemplary embodiment will be described. First, with reference to FIG. 19, the entire processing flow based on cooperation between the server 101 and each game system 1 will be described. FIG. 19 shows a game system side process at the left and a server side process at the right. First, when a predetermined player performs an instruction to start the competitive game, a preparation process P1 is executed between each game system 1 and the server 101. In this process, with a closing time set, participation of up to thirty-five players is accepted. Then, when the closing time is reached, if the number of participants is less than thirty-five, AI players for the deficiency are set as appropriate, and information about opponents including the AI players is transmitted to each game system 1, whereby a process P2 for executing the competitive game as described above is started. Thereafter, when the number of participants who have ended up game over has reached thirty-four, the server 101 transmits a notification indicating that the competitive game is ended, to the game system 1. Then, in each game system 1, processing such as displaying the final ranking is executed, and a process P3 for ending the game (disconnection of communication session, etc.) is performed, whereby the competitive game according to the exemplary embodiment is ended.

[Details of Process Executed on Game System Side]

Figure 20:
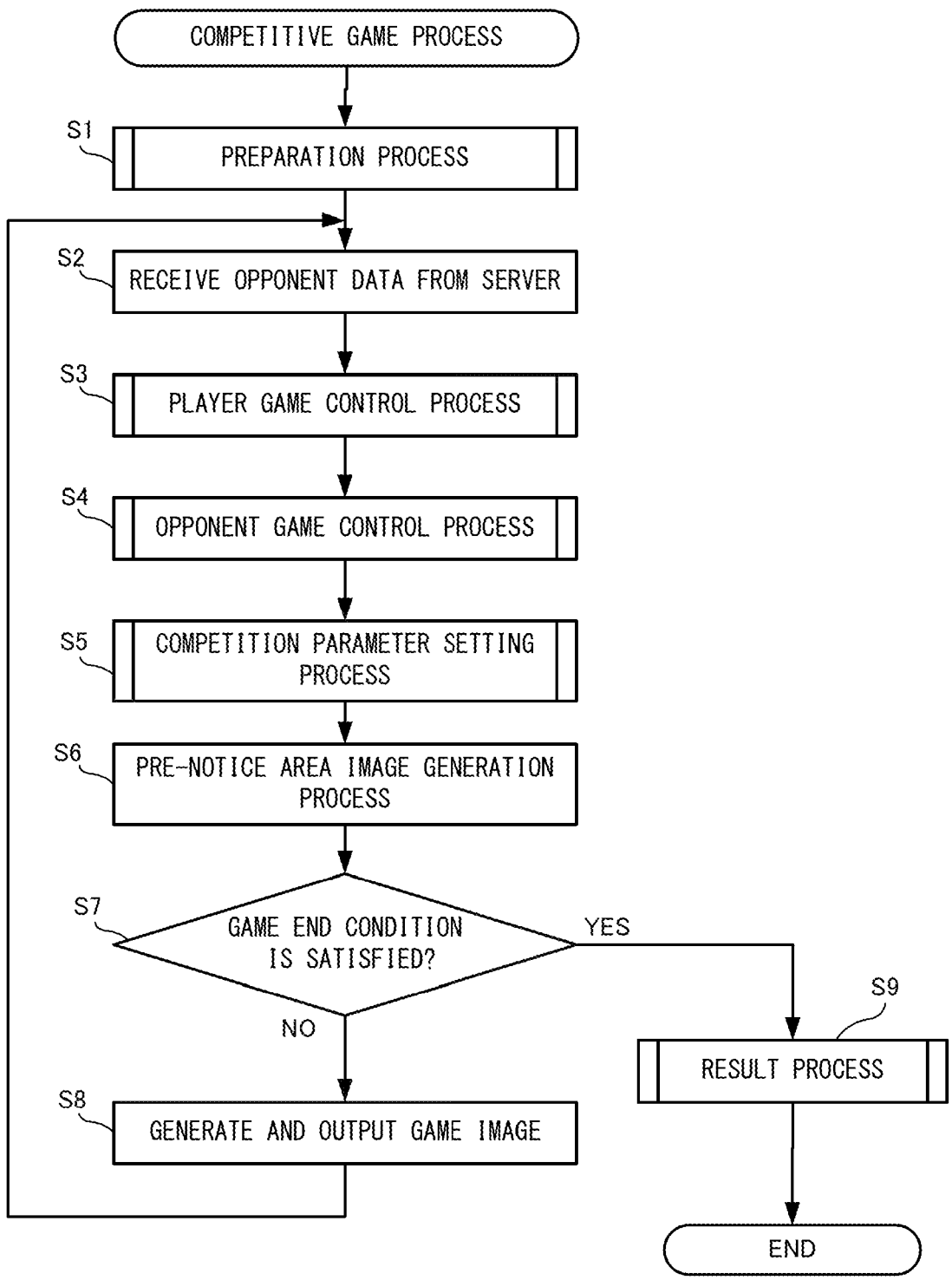
FIG. 20 is a non-limiting example of a flowchart showing the details of a competitive game process.

Next, the details of the competitive game process executed in each game system 1 will be described. FIG. 20 is a flowchart showing the details of the competitive game process according to the exemplary embodiment. This process is executed after expiration of the above closing time. The flowchart shown in FIG. 20 is merely an example of the processing procedure. Therefore, the order of processing steps may be changed as long as the same result is obtained. In addition, the values of variables, and thresholds used in determination steps, are also mere examples, and other values may be employed as necessary.

Figure 21:
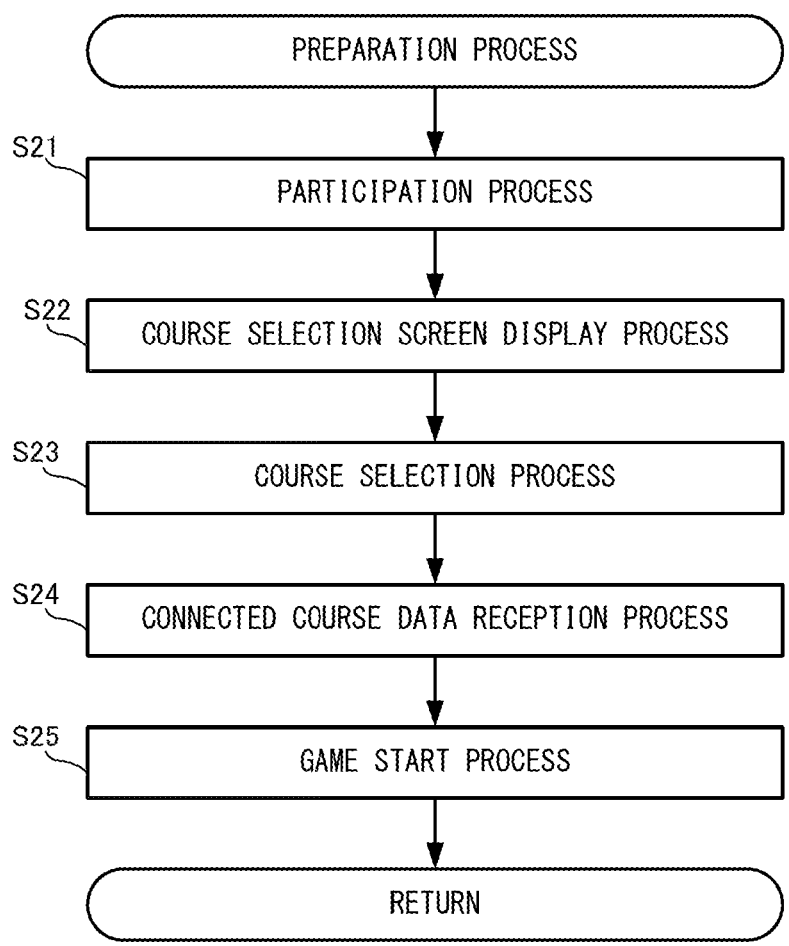
FIG. 21 is a non-limiting example of a flowchart showing the details of a preparation process.

First, in step S1 in FIG. 20, the processor 81 executes a preparation process for various matters for starting the competitive game. FIG. 21 is a flowchart showing the details of the preparation process. First, in step S21, the processor 81 executes a participation process while transmitting and receiving necessary data as appropriate through cooperation with the server 101. In this process, mainly, transmission of a competitive game start command to the server 101 and a participant acceptance process are executed. This process is ended when information notifying that the participant acceptance is closed is sent from the server 101.

Next, in step S22, the processor 81 executes a course selection screen display process. As described above, in the exemplary embodiment, each participant is to select one course for generating the connected course, and therefore a course selection screen to be presented as options to the player is generated in this process. Specifically, the processor 81 extracts courses selectable in accordance with the game progress of the player, on the basis of the single-player mode progress information 331, and generates a screen for indicating a list of the extracted courses, as the course selection screen. Then, the processor 81 displays this screen and waits for a selecting operation from the player.

Next, in step S23, the processor 81 identifies the player's selection on the course selection screen on the basis of the operation data 333. Then, the processor 81 transmits information indicating the course selected by the player, to the server 101, together with the acquired coin cumulative sum information 332. The server 101 executes processing of generating a connected course on the basis of the received data, and transmits data indicating the configuration of the connected course, to the game system 1.

Next, in step S24, the processor 81 receives the transmission connected course data 383 transmitted from the server 101, and stores the received data as the connected course information 337 in the player game area 308. In addition, the processor 81 stores this data also as the connected course information 365 in the opponent game area 309.

Next, in step S25, the processor 81 executes a process for starting play for the connected course, on the basis of a game start instruction transmitted from the server 101. In the exemplary embodiment, a countdown representation as described above is performed. When the countdown is finished, the preparation process is also finished.

With reference to FIG. 20 again, next, in step S2, the processor 81 transmits a request for competition data to the server 101, and receives the transmission opponent data 385 transmitted from the server 101 as a response. Then, the processor 81 stores this data as the received data 307 in the competitive game process area 305.

Figure 22:
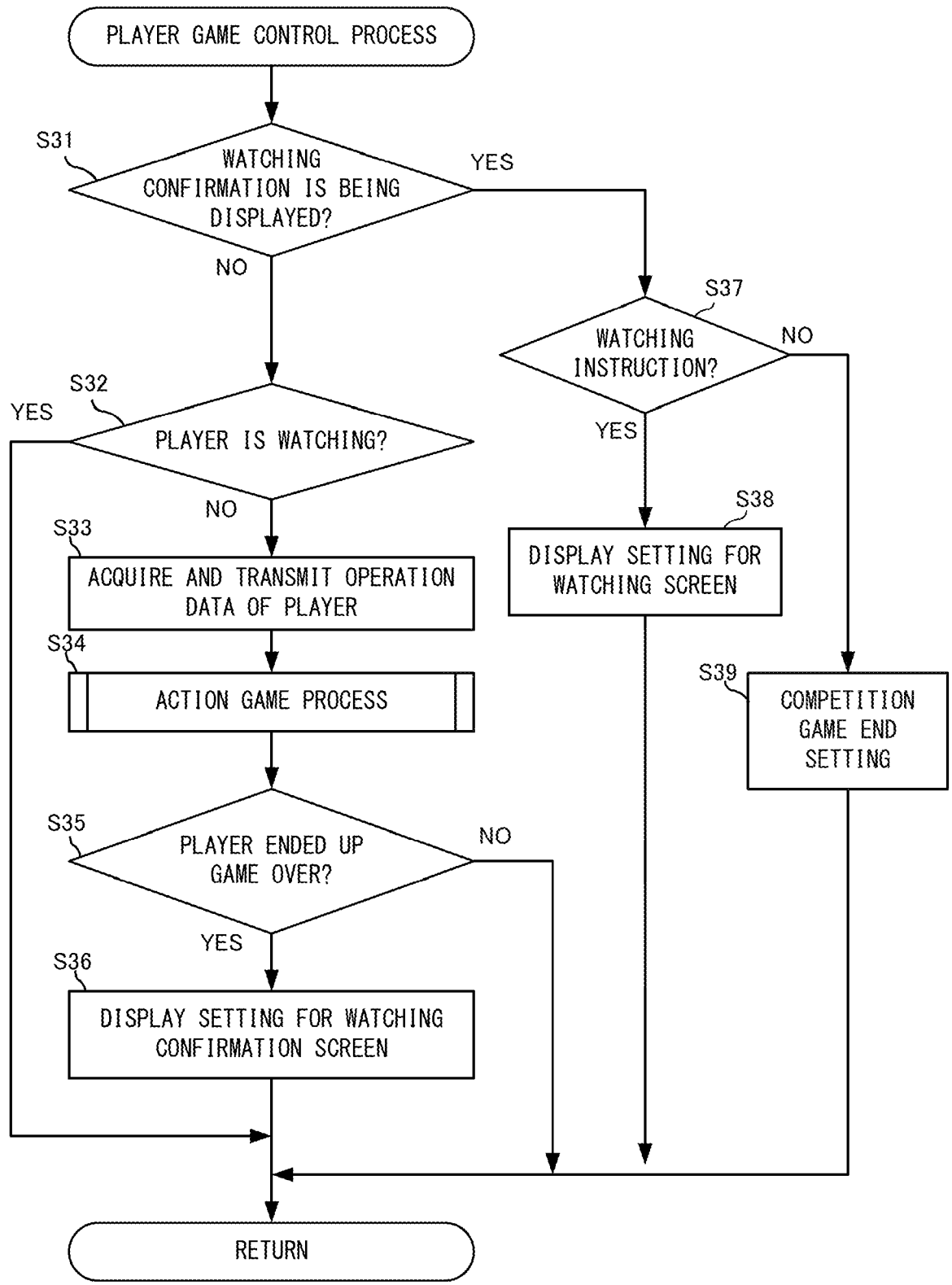
FIG. 22 is a non-limiting example of a flowchart showing the details of a player game control process.

Next, in step S3, the processor 81 executes a player game control process. This process is a process for performing control of the jump action game for the player, and the like. FIG. 22 is a flowchart showing the details of the player game control process. In FIG. 22, first, in step S31, the processor 81 determines whether or not a watching confirmation screen is being displayed. This screen is a screen for which display setting is performed in step S36 described later, and is used for, when the player has ended up game over, asking the player whether or not to watch the game thereafter. As a result of the determination, if the confirmation screen is not being displayed (NO in step S31), next, in step S32, the processor 81 refers to the KO state information 336 in the player game area 308, to determine whether or not the player is watching the game at present. That is, whether or not the player is in a state after having ended up game over is determined. As a result of the determination, if the player is watching the game (YES in step S32), the player game control process is ended.

On the other hand, if the player is not watching the game (NO in step S32), next, in step S33, the processor 81 acquires the operation data 333 for the player. Further, the processor 81 generates the server transmission data 306 on the basis of the content of the acquired data, and transmits the server transmission data 306 to the server 101.

Figure 23:
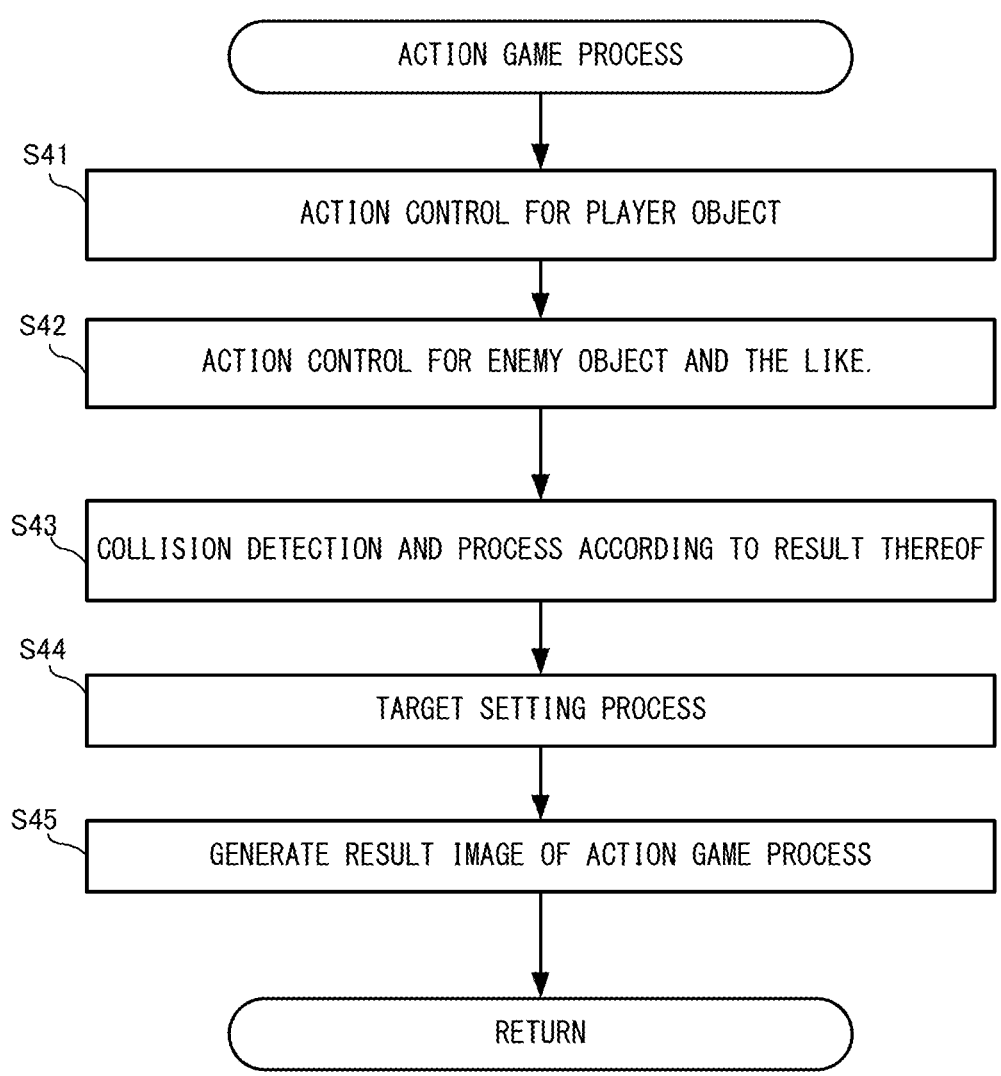
FIG. 23 is a non-limiting example of a flowchart showing the details of an action game process.

Next, in step S34, the processor 81 executes an action game process. This process is a process for advancing the jump action game for the player by using the action game engine 302. FIG. 23 is a flowchart showing the details of the action game process. In FIG. 23, first, in step S41, the processor 81 performs action control for the player object 201 on the basis of the operation content indicated by the operation data 333.

Next, in step S42, the processor 81 performs action control for various types of enemy objects (default enemy and assassin). In addition, if, other than the enemy objects, there is any object for which action control is needed (e.g., a moving floor), action control therefor is also executed as appropriate. Next, in step S43, the processor 81 executes collision detection of each object and various types of game processing based on the detection result. Specifically, processing of determining whether or not an attack on an enemy object has succeeded, increasing or decreasing the number of possessed coins, incrementing the time limit when the attack on the enemy object has succeeded, and decrementing the time limit with elapse of time, is performed here. In addition, in a case of ending up game over, information indicating that the player has ended up game over is set in the KO state information 336.

Next, in step S44, the processor 81 executes a target setting process. Specifically, the processor 81 determines whether or not an operation of changing the "tactics" has been performed, on the basis of the operation data 333, and if the operation has been performed, the processor 81 updates the content of the tactics and target information 367 on the basis of the operation content, to change the "tactics" that is being selected at present. Further, on the basis of the present "tactics", the processor 81 determines the "target" and reflects the result in the tactics and target information 367. It is noted that the target setting process may be performed after an opponent's game process described later is performed.

Next, in step S45, the processor 81 generates a game image in which the result of the game process as described above is reflected, and stores the game image in the game image storage area 340. Thus, the game image to be displayed in the action game area 213 for a frame at this time has been prepared. Thus, the action game process is ended.

With reference to FIG. 22 again, next, in step S35, the processor 81 determines whether or not the player has (newly) ended up game over as a result of the above action game process, on the basis of the KO state information 336 in the player game area 308. If the player has not ended up game over (NO in step S35), the player game control process is ended. If the player has ended up game over (YES in step S35), in step S36, the processor 81 performs setting for displaying a watching confirmation screen as described above. That is, the processor 81 generates a game image for asking the player whether or not to watch the game, and stores the game image in the game image storage area 340. Then, the player game control process is ended.

Next, a case where it is determined that the watching confirmation screen is being displayed as a result of the determination in step S31 (YES in step S31) will be described. In this case, in step S37, the processor 81 refers to the operation data 333, to determine whether or not an operation of instruction for watching has been performed. If a watching instruction has been performed (YES in step S37), next, in step S38, the processor 81 performs display setting for a watching screen. That is, the processor 81 generates an image to be displayed in the action game area 213 during watching, and stores the image in the game image storage area 340.

On the other hand, as a result of the determination in step S37, if a watching instruction has not been performed (NO in step S37), in step S39, the processor 81 performs end setting for ending the competitive game. Thus, in determination in step S7 described later, it will be determined that a condition for ending the game is satisfied. Then, the player game control process is ended.

Figure 24:
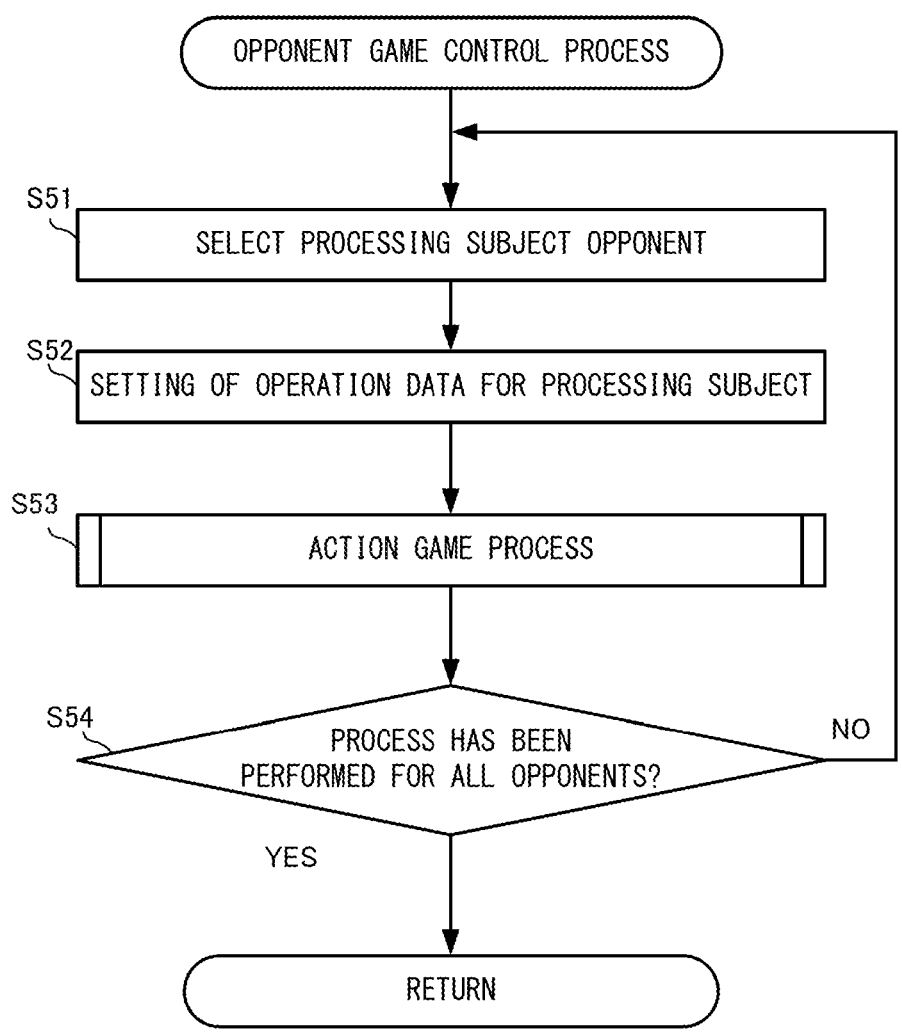
FIG. 24 is a non-limiting example of a flowchart showing the details of an opponent game control process.

With reference to FIG. 20 again, next, in step S4, the processor 81 executes an opponent game control process. This process is a process for executing (reproducing) each opponent's game process on the basis of operation data transmitted from the opponents. FIG. 24 is a flowchart showing the details of the opponent game control process. First, in step S51, the processor 81 selects one of thirty-four opponents as a processing subject (hereinafter, the selected opponent is referred to as "processing subject player"). Next, in step S52, the processor 81 specifies data corresponding to the processing subject player, among the received data 307, and extracts the transmission operation data 323 of the processing subject player. Further, the processor 81 sets the transmission operation data 323 in the operation data 361 of the opponent game area 309 corresponding to the processing subject player. That is, the setting is performed so that the transmission operation data 323 is used as the operation data 361.

Next, in step S53, the processor 81 executes an action game process for the processing subject player. The details of this process is basically the same as the above process in step S34, except that the data in the opponent game area 309 is used. Therefore, the detailed description thereof is omitted. As a result of this process, the jump action game process based on the transmission operation data 323 for the processing subject player is executed, and the resultant game image is stored into the game image storage area 368 of the opponent game area 309.

Next, in step S54, the processor 81 determines whether or not the action game process has been performed for all the thirty-four opponents. As a result, if there remains an opponent for which the process has not been performed yet (NO in step S54), the processor 81 returns to step S51, to repeat the process by selecting a processing subject player among the opponents for which the process has not been performed yet. On the other hand, if the action game process has been performed for all the opponents (YES in step S54), the opponent game control process is ended.

Figure 25:
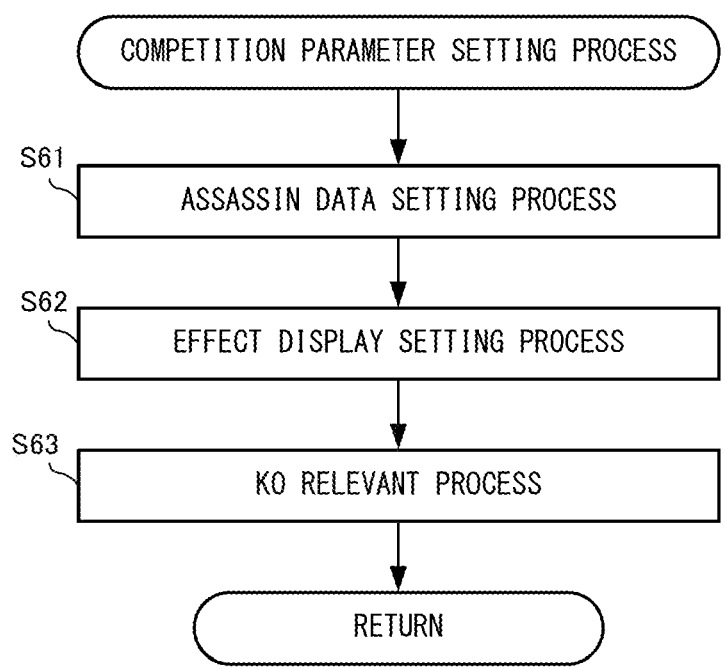
FIG. 25 is a non-limiting example of a flowchart showing the details of a competition parameter setting process.

With reference to FIG. 20 again, next, in step S5, the processor 81 executes a competition parameter setting process. In this process, mainly, processing relevant to interaction between a plurality of players, such as for sending in assassins described above, is performed. FIG. 25 is a flowchart showing the details of the competition parameter setting process. First, in step S61, the processor 81 executes an assassin data setting process. This process is a process for setting the contents of the assassin placement position information 338 and 366 on the basis of the results of the above jump action game processes. In this process, first, the processor 81 refers to the time stamps 322 of the operation data of all the participants including the player him/herself, and sorts the participants in the ascending order of the times. Then, the following process is performed for each participant. First, the processor 81 determines, for each participant, whether or not there is an enemy object 202 defeated by the player object 201 of the participant, in the game process for a frame at this time. In the exemplary embodiment, at the time when an attack hits on the enemy object, it is determined that the attack action has succeeded and the enemy object is "defeated". That is, even though a defeated motion of the enemy object may be displayed thereafter, before the defeated motion is finished, it is determined that the enemy object is defeated at the time when the attack action has succeeded, and also a condition for sending in an assassin is regarded as satisfied at that time. As a result of such determination, if there is an enemy object 202 defeated by the player object 201, next, the processor 81 identifies the opponent that is being set as the "target" at this time. Next, the processor 81 refers to the assassin placement position information 366 for the opponent, and determines the placement position for the assassin on the basis of the placement rule as described above. Then, the processor 81 updates the content of the assassin placement position information 338 for the player and the content of the assassin placement position information 366 for the opponent, with the determined placement position and information (kind of enemy, etc.) for specifying the defeated enemy object associated with each other. Through such a process, assassins are mutually sent in between the participants including the player him/herself.

Next, in step S62, the processor 81 executes an effect display setting process. This process is a process for performing display setting for the target image 231 and the line 232 described above in accordance with the "target" relationship between the player and the opponents. That is, setting is performed for displaying the target image 231 to be superimposed on the opponent image set as a "target" by the player. In addition, setting is performed for drawing the line 232 connecting the warning area 215 and the opponent image for the opponent who sets the player as a "target". Besides, in this processing, display setting may be performed so that, when the player sends in an assassin to an opponent, an effect indicating this is displayed.

Next, in step S63, the processor 81 executes a KO relevant process. This process is a process relevant to adjustment of the possessed coins and the time limit when any of the players has ended up game over. Specifically, the following process is performed. First, the processor 81 determines whether or not any of the players has ended up game over. If game over has occurred, the processor 81 determines whether or not the game over is due to an assassin from another player as described above. If the game over is due to an assassin from another player, the number of possessed coins of the player who has ended up game over, and the time limit thereof at that point of time, are added to the possessed coin information 334 or 362 and the time limit information 335 or 363 corresponding to the player who has sent in the assassin. On the other hand, if the game over is not due to an assassin, the processor 81 determines whether or not at least one assassin has been sent in to the game for the player who has ended up the game over. If at least one assassin has been sent in, the processor 81 determines the last player who has sent in an assassin on the basis of the time stamp 322, and executes processing of giving the possessed coins and the time limit to the last player. On the other hand, if no assassins have been sent in, processing of giving the possessed coins and the time limit is not performed. After the KO relevant process is done as described above, the competition parameter setting process is ended.

It is noted that the number of coins given in step S63 is merely an example. In another exemplary embodiment, the half of the possessed coins of the player who has ended up game over may be given, for example. Similarly, regarding the time limit, not all of the remaining time but half the remaining time may be given, for example. That is, part of the possessed coins and the remaining time may be given.

With reference to FIG. 20 again, next, in step S6, the processor 81 executes a pre-notice area image generation process. This process is a process for generating an image to be displayed in the pre-notice area 214 as described in FIG. 10 to FIG. 12. Specifically, the processor 81 refers to the basic course data 304 and the assassin placement position information 338 in the player game area 308, to specify the positions of default enemies and assassins placed in a range up to two screens ahead from the present position of the player object 201 in the connected course. Then, on the basis of the specified positions, the processor 81 generates an image for the pre-notice area 214 as described above, using the mini player image 223 and the mini enemy image 224, and temporarily stores the generated image in the storage section 84.

Next, in step S7, the processor 81 determines whether or not the condition for ending the competitive game is satisfied. In the exemplary embodiment, the competitive game end condition is a case where "the participant who has not ended up game over has become the last surviving player" or a case where "the player who has ended up game over has chosen not to watch the game". In the exemplary embodiment, information indicating that the former case is satisfied is transmitted from the server 101. Therefore, here, the processor 81 determines whether or not the competitive game end setting has been performed in step S39, and whether or not a notification that the competitive game is ended is received from the server 101. If neither of the conditions is satisfied (NO in step S7), in step S8, the processor 81 generates a game image for the competitive game as described in FIG. 6, using the images in the game image storage area 340 of the player game area 308 and the game image storage area 368 of the opponent game area 309, and the image generated through the pre-notice area image generation process. In addition, at this time, an image for some kind of effect may be displayed as appropriate. For example, in a case where the player sends in an assassin to a predetermined opponent, an icon image like a light ball or an icon image that allows the player to know what assassin is sent in (e.g., an outer appearance image of the assassin) may be displayed from the display position of the player object 201 toward the opponent image to which the assassin is sent in. Then, the processor 81 displays the game image for the competitive game, generated as described above, on the display 12. Thereafter, the processor 81 returns to step S2, to repeat the process.

Regarding the determination as to whether the competitive game end condition is satisfied, in another exemplary embodiment, whether or not an event in which "the participant who has not ended up game over has become the last surviving player" has occurred may be determined on the basis of the operation data 361 of the opponents, in the game system 1 of each player.

Figure 26:
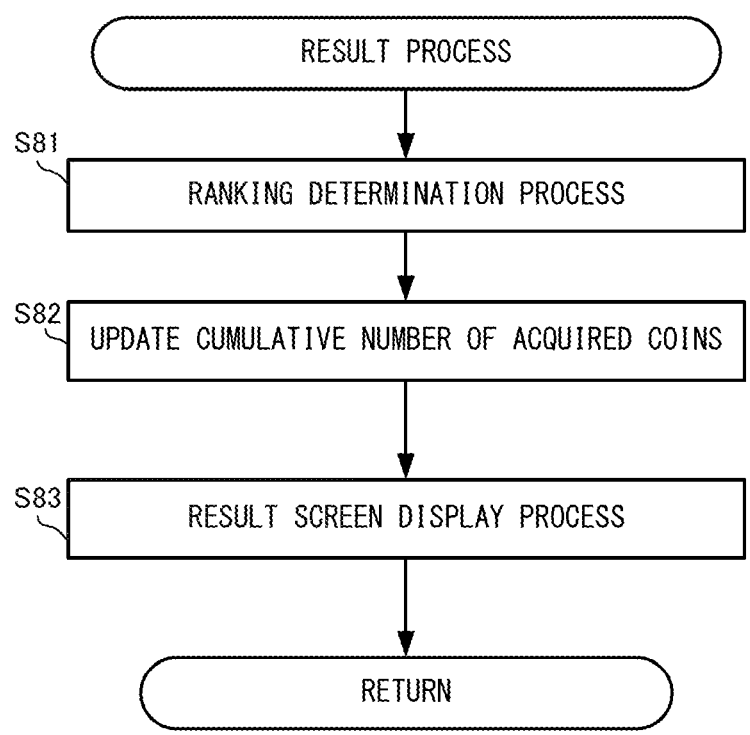
FIG. 26 is a non-limiting example of a flowchart showing the details of a result process.

On the other hand, if either of the above competitive game end conditions is satisfied (YES in step S7), in step S9, the processor 81 executes a result process. FIG. 26 is a flowchart showing the details of the result process. First, in step S81, the processor 81 executes a process of determining the rankings. In a case where the ending of the competitive game is due to the player choosing not to watch the game, only the ranking of the player at that time is determined. In a case where the ending is due to the fact that the participant who has not ended up game over has become the last surviving player, the final rankings of the participants are determined. In the exemplary embodiment, the earlier the participant ends up game over, the lower the ranking is, and the participant who has become the last surviving player is ranked 1st. In other words, as the participant continues playing longer without ending up game over, the participant is evaluated to be ranked higher.

It is noted that the ranking determination process may be performed on the server 101 side and a result thereof may be received.

Next, in step S82, the processor 81 updates the cumulative number of acquired coins of the player. Specifically, the number of coins that have been acquired by the player until the competitive game at this time is ended since the start thereof (i.e., possessed coin information 334) is added to the acquired coin cumulative sum information 332, whereby the cumulative number of acquired coins is updated. Therefore, in both of a case where the player has ended up game over halfway in the course, and a case where the player has become the last surviving player, the coins that have been acquired until that time are accumulated.

Next, in step S83, the processor 81 executes a result screen display process. As the result screen, for example, in a case where "the player who has ended up game over has chosen not to watch the game", a screen indicating the ranking of the player at that time is displayed. In a case where "the participant who has not ended up game over has become the last surviving player", the final rankings of the participants are displayed in a list form. Besides, a representation indicating end of the competitive game, or the like, may be displayed as appropriate. Then, for example, when a predetermined input is received from the player on the result screen, the result process is ended.

When the result process is ended, the competitive game process (for one play) according to the exemplary embodiment is finished. Thus, the detailed description of the competitive game process executed by each game system 1 is finished.

[Details of Process on Server Side]

Figure 27:
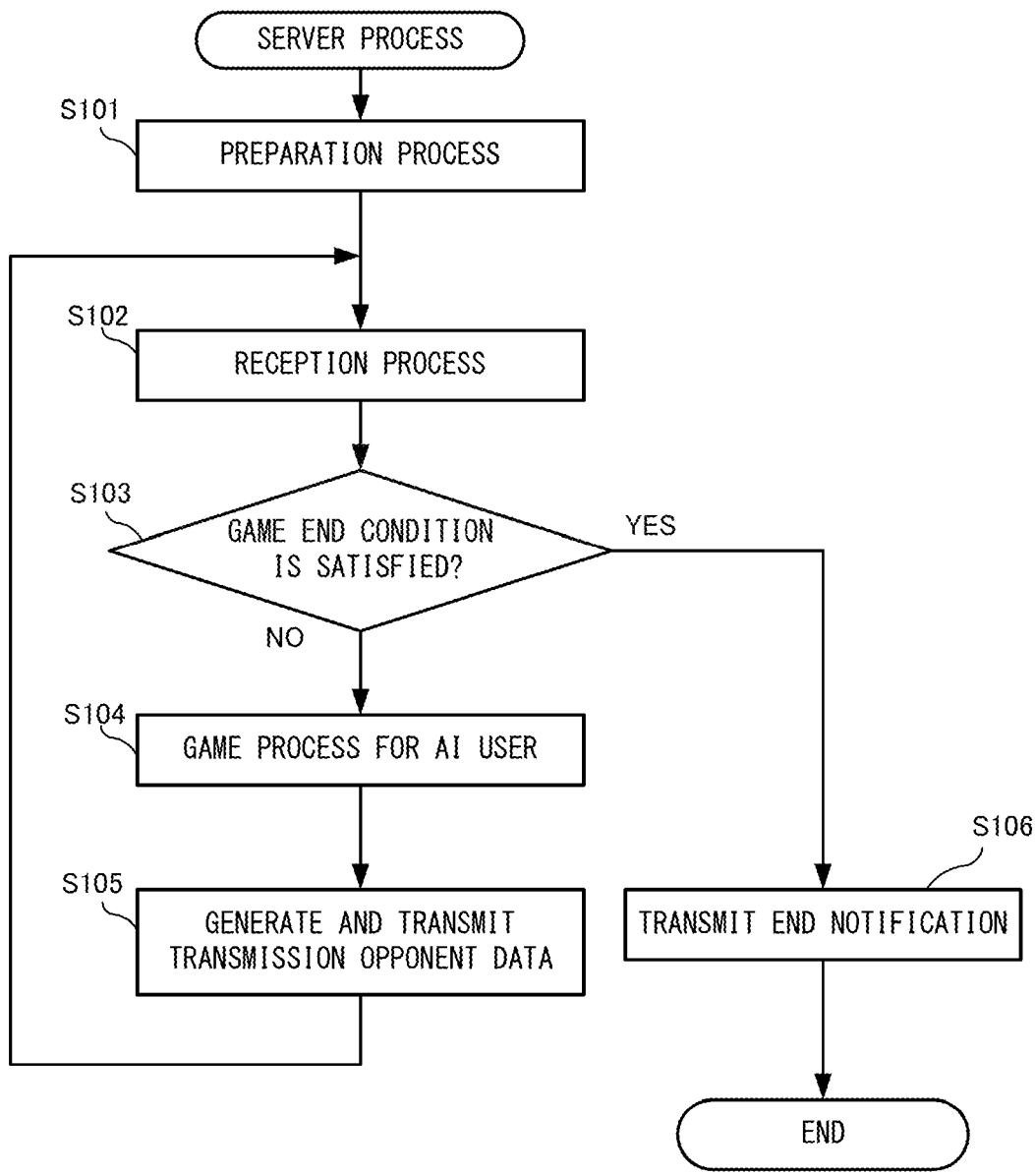
FIG. 27 is a non-limiting example of a flowchart showing the details of a server process.

Next, the details of the process executed by the server 101 will be described. FIG. 27 is a flowchart showing the details of the server process to be executed by the processor 111 of the server 101. First, in step S101, the processor 111 executes a preparation process. Specifically, the processor 111 generates the participant data 382 on the basis of data transmitted from each game system 1 participating in this game. At this time, in a case where the number of participants is less than thirty-five, the processor 111 plays a role as an AI user for the deficiency. Therefore, the processor 111 generates the participant data 382 so as to include the data for the AI user. Further, when participant acceptance is finished, the processor 111 receives information about courses selected by the participants, and generates the connected course on the basis of this information. Then, the processor 111 transmits information indicating the configuration of the connected course, to the game system 1 of each participant. Thereafter, when preparation for starting the competitive game is made, the processor 111 transmits a competitive game start instruction to each game system 1.

Next, in step S102, the processor 111 executes a reception process. That is, the processor 111 receives the server transmission data 306 transmitted from each game system 1, and stores the received data as the participant state received data 384.

Next, in step S103, the processor 111 determines whether or not the competitive game end condition is satisfied. Here, the end condition is that "the player who has not ended up game over has become the last surviving player". The processor 111 determines whether or not the condition is satisfied on the basis of the KO state information 324. As a result of the determination, if the end condition is not satisfied (NO in step S103), next, in step S104, the processor 111 executes a jump action game process for the AI user. It is noted that, in a case where an AI user is not needed, this process is not performed.

Next, in step S105, the processor 111 generates the transmission opponent data 385 to be transmitted to each game system 1, on the basis of the participant state received data 384. Specifically, the processor 111 generates data about the participants other than the player of the game system 1 that is the transmission destination, as the transmission opponent data 385. For example, data including the server transmission data 306 of the participants other than the player A is generated as the transmission opponent data 385 for the player A. Such data is generated for each participant, and is transmitted to each participant. At this time, such data may not be transmitted to the game system 1 of the player who has chosen not to watch the game after ending up game over. After this process, the processor 111 returns to step S102 to repeat the process.

On the other hand, as a result of the determination in step S103, if the game end condition is satisfied (YES in step S103), in step S106, the processor 111 transmits an end notification for giving an instruction to end the competitive game, to each game system 1. Also here, the transmission may not be performed for the game system 1 of the player who has chosen not to watch the game after game over.

Thus, the description of the server-side process has been finished.

As described above, the exemplary embodiment provides a new game method that enables multiple players to enjoy together using a game designed and created as a single-play game. That is, while each player advances a game with a sense of playing a single-player game, it is possible to interfere with another player by using an assassin as described above without performing a particular operation such as a specific attack operation to an opponent. Thus, an unprecedented novel game can be provided. Such a new competitive game can be provided by utilizing a conventionally existing game assumed as a single-play game, whereby the development cost can be reduced.

[Modifications]

In the above exemplary embodiment, operation data of each participant is transmitted and received as data indicating the game state, and the game states of the other players are reproduced on the game system 1 of each participant, whereby the competitive game is realized. In another exemplary embodiment, without limitation to the above configuration, as the data indicating the game state, position information (coordinate information) of each object in the virtual game world at the time of the transmission, image data obtained through capturing of the action game area 213 or the like at the time of the transmission, or data such as target information about each participant, may be transmitted to the other participants. Then, on the basis of such information, an image to be displayed in the second area 212 may be generated and displayed.

In the above exemplary embodiment, as an example of "obstruction" by an assassin, a case where the player loses one life upon contact with the assassin (if a player's attack has failed) has been shown. Other than this, the "obstruction" from the assassin to the player object may be such an obstruction that makes the player object 201 unable to move for several seconds, for example. Alternatively, such an obstruction as to obstruct advancement of an opponent's game may be employed.

In the above exemplary embodiment, a case where (substantially) the same enemy object as an enemy object defeated by the player object 201 is sent in as an assassin, has been shown. In another exemplary embodiment, an object different from the defeated enemy object may be sent in as an assassin. For example, a dedicated assassin enemy object having a role as an assassin may be used. In this case, the dedicated assassin is always sent in irrespective of the kind of the enemy object 202 defeated by the player object 201 or the like. Alternatively, when a plurality of assassins that have been sent in satisfy a predetermined condition, an enemy object different from those that have been sent in may be placed. For example, when a plurality of assassins in combination satisfy a predetermined condition, the plurality of assassins may be united so as to be treated as one different individual assassin.

In the above exemplary embodiment, images indicating the opponent's game states are displayed in the second areas. However, in another exemplary embodiment, such images for the opponents may not be displayed. That is, although assassins are sent in from each other as described above, the opponents' game states may not be displayed.

Regarding the generation of the connected course described above, in the above exemplary embodiment, the server 101 generates a connected course on the basis of the courses selected by the respective players and transmits the configuration data thereof to each game system. In another exemplary embodiment, without the server 101 generating the connected course, the game system 1 of each player may generate a connected course on the basis of operation data of the respective players. That is, in starting the competitive game, operation data about course selection operations performed by the other players may be received and the connected course may be generated on the basis of the received data. As an example, instead of the process in step S24 in the preparation process, the following process may be performed. First, operation data of the respective opponents are received. Next, courses selected by the respective players are specified on the basis of the operation contents indicated by the operation data. Further, a connected course is generated on the basis of the selected courses. Then, information indicating the generated connected course is stored as the connected course information 337. Also in this case, among the game systems 1 of the respective participants, the processes are based on the same operation data and therefore the same connected course is generated.

Regarding the arrangement order of the courses in generating the connected course, in the above exemplary embodiment, the courses are connected in the order from the one for the player of which the cumulative number of coins is smallest. In another exemplary embodiment, "ranks" of the players may be determined on the basis of the cumulative numbers of coins, and courses may be connected in the order from the player who is the lowest in the "rank". For example, this can be applied to such a game in which the "rank" becomes higher as the cumulative number of acquired coins increases.

Regarding generation of the connected course described above, if there is a part where identical courses are consecutively arranged when the courses are merely connected, these identical courses may be integrated as one course. For example, in a case where the connected course is generated with the arrangement order of "course 1", "course 3", "course 3", "course 2", . . . when the courses are merely connected, the consecutive courses 3 may be replaced with one course 3, resulting in the order of "course 1", "course 3", "course 2", . . . (the number of courses decreases with such integration of courses).

The connected course generation method as described above is applicable to not only a competitive game configured as described above, but also a multiplayer game in which player characters operated by multiple players are present in the same game space simultaneously (in other words, a multiplayer game that advances while establishing synchronization among the game processes of the players).

In another exemplary embodiment, start points may be different among the participants. For example, the connected course is set to have a loop configuration so as to return to the first course after finishing the last course. Then, start points for the competitive game are set in courses different among the participants. Further, the configuration of the connected course may be different among the participants. For example, the order of connection of courses selected by the participants may be set to be different among the participants, whereby the participants may be caused to play connected courses having different configurations.

In the above exemplary embodiment, the game having two game modes, i.e., "single-player mode" and "competitive mode", has been shown as an example. In another exemplary embodiment, the "single-player mode" may not be provided. For example, only a game corresponding to the "competitive mode" may be allowed to be played. In this case, the game may be configured such that only a "course 1" is allowed to be played in an initial state and then other courses are sequentially released through repetition of competitive play with other players. For example, one new course or a set of several new courses may be allowed to be played, every time the number of times of competition reaches a predetermined number.

In another exemplary embodiment, the above-described competitive game process may be performed not via the server 101, but through (peer-to-peer) connection between the game systems 1 using short-range wireless communication or the like, for example.

In addition, a configuration may be made such that, for example, with only one player playing, AI users serve as the other thirty-four opponents, and the above game process is executed by a single game system 1 alone. For example, the processor 81 may perform processing to play roles as the thirty-four AI users.

Regarding arrangement of the first area 211 and the second areas 212, in the above exemplary embodiment, the first area 211 is placed at the center of the game image and two second areas 212 are located at the left and the right thereof. However, without limitation thereto, the second areas 212 may be located on the upper and lower sides of the first area 211, for example. Alternatively, the positions of the second areas 212 may not be fixed, and for example, may be constantly moved so as to circulate around the first area 211.

The above game process can be executed not only with the game system 1 described above, but also with an information processing apparatus such as a hand-held game apparatus or a smartphone, for example. Here, in a case of executing the above process with a hand-held game apparatus having two display screens, for example, the first area (an image for the player to play the game) may be displayed on a first display screen, and the second area (i.e., opponent images for opponents) may be displayed on a second display screen.

In another exemplary embodiment, a series of processes as described above in the game process for each player may be executed in an information processing system including a plurality of information processing apparatuses. For example, in an information processing system including a terminal-side apparatus and a server-side apparatus that is communicable with the terminal-side apparatus via a network, some of the series of processes may be executed by the server-side apparatus. Alternatively, in an information processing system including a terminal-side apparatus and a server-side apparatus that is communicable with the terminal-side apparatus via a network, a major part of the series of processes may be executed by the server-side apparatus, and other processes may be executed by the terminal-side apparatus. For example, a major game process may be executed by the server-side apparatus, and the terminal-side apparatus may mainly perform processing of receiving and outputting a game image and a sound generated as a result of the game process by the server-side apparatus, thus advancing the game (so-called cloud gaming) In the above information processing system, a server-side system may be composed of a plurality of information processing apparatuses so that the process to be executed on the server side is executed by the plurality of information processing apparatuses in a cooperated manner.

While the exemplary embodiments have been described herein, it is to be understood that the above description is, in all aspects, merely an illustrative example, and is not intended to limit the scope thereof. It is to be understood that various modifications and variations can be made without deviating from the scope of the exemplary embodiments.

What is claimed is:

1. A non-transitory computer-readable storage medium having stored therein a game program to be executed by a processor of a first information processing apparatus, the game program, when executed, causing the processor to at least:
   start execution of a first game based on a game process that advances, wherein a game start timing of the first game is adjusted to be the same as game start timings of the plurality of opponents, the plurality of opponents using second information processing apparatuses that execute game processes;
   perform a game process on the basis of an operation by a player in the first game;
   transmit first game state data regarding a game state of the first game, to each of the second information processing apparatuses;
   acquire second game state data regarding a game state of a second game executed in each of the second information processing apparatuses;
   sequentially generate a display image including a first image based on the first game state data and a second image based on the acquired second game state data;
   decrease a time limit set in advance for the player, with elapse of time;
   if a predetermined condition is satisfied in the first game, add a predetermined value to the time limit;
   end advancement of the first game, at least when the time limit reaches zero; and
   if advancement of the first game is ended, perform evaluation for a result of the first game relative to results of the plurality of second games, in accordance with a length of actual time that has elapsed since start of execution of the first game.

2. The non-transitory computer-readable storage medium according to claim 1, wherein the game program, when executed, further causes the processor to cause an obstructing object for obstructing advancement of the first game to appear in the first game, and
   wherein if the predetermined condition is satisfied on the obstructing object, the predetermined value is added to the time limit.

3. The non-transitory computer-readable storage medium according to claim 2, wherein the obstructing object is restricted from appearing, until a predetermined condition regarding a position of a player object in a virtual game space is satisfied in the first game.

4. The non-transitory computer-readable storage medium according to claim 1, wherein:
   a plurality of kinds of operations are defined for the predetermined condition on the obstructing object, and
   the predetermined value to be added to the time limit is different in accordance with the kind of the action.

5. The non-transitory computer-readable storage medium according to claim 1, wherein the first game and the second game are the same game.

6. The non-transitory computer-readable storage medium according to claim 5, wherein a placement position of the obstructing object at a time of game start is the same between the first game and the second game.

7. The non-transitory computer-readable storage medium according to claim 5, wherein:
   a plurality of game courses which are virtual game spaces to be game-played are included in the first game,
   the game program, when executed, further causes the processor to at least:
     select a game course from among a predetermined plurality of game courses on the basis of an operation by the player, at a time of game start, and
     generate one connected course by connecting, in a predetermined order, game courses selected by the player and the opponents, and
   the first game is a game using the connected course.

8. The non-transitory computer-readable storage medium according to claim 7, wherein the game courses are connected in the predetermined order determined on the basis of play histories regarding the game programs of the player and the opponents, to generate one connected course.

9. The non-transitory computer-readable storage medium according to claim 7, wherein selectable game courses among the plurality of game courses are different on a player-by-player basis.

10. The non-transitory computer-readable storage medium according to claim 1, wherein:
a first obstructing object for obstructing advancement of the first game is caused to appear in the first game on the basis of a predetermined rule,
if the acquired second game data indicates that an operation by the opponent has satisfied the predetermined condition on the first obstructing object that has appeared in the second game, a second obstructing object is caused to appear in the first game, and
if the predetermined condition is satisfied on the first obstructing object in the first game, information for causing the second obstructing object to appear in the second game for a predetermined opponent is transmitted so as to be included in the first game data.

11. The non-transitory computer-readable storage medium according to claim 10, wherein if the second game for the opponent is made into an advancement impossible state by the second obstructing object that has appeared in the second game on the basis of the transmitted first game data, at least a part of a remaining time limit of the opponent at that time is given to the player.

12. The non-transitory computer-readable storage medium according to claim 11, wherein:
if the first game is made into an advancement impossible state by the second obstructing object that has appeared in the first game, at least a part of a remaining time limit of the player at that time is given to the opponent who has caused the second obstructing object to appear, and
if the first game is made into an advancement impossible state by the first obstructing object appearing in the first game, or if the first game is made into an advancement impossible state not due to the first obstructing object while the second obstructing object is not present in the first game, addition of a time limit to the opponent is restricted.

13. The non-transitory computer-readable storage medium according to claim 10, wherein if the predetermined condition is satisfied on the first obstructing object, an appearance instruction for causing the same object as the first obstructing object to appear as the second obstructing object in the second game is further transmitted.

14. The non-transitory computer-readable storage medium according to claim 10, wherein the second obstructing object is displayed in a display manner different from that of the first obstructing object.

15. The non-transitory computer-readable storage medium according to claim 10, wherein:
the first game is a game in which a player object is moved in a predetermined advancing direction in a virtual game world, and
the second obstructing object is caused to appear at a predetermined position that is on the advancing direction side with respect to a present position of the player object in the virtual game world, the predetermined position not being included in a screen displayed at present.

16. The non-transitory computer-readable storage medium according to claim 15, wherein in a case where there are a plurality of the second obstructing objects to appear, each second obstructing object is caused to appear at the predetermined position such that, the earlier a timing at which an operation by the opponent has satisfied the predetermined condition on the first obstructing object appearing in the second game is, the closer the predetermined position is to the present position of the player object.

17. The non-transitory computer-readable storage medium according to claim 10, wherein:
a plurality of kinds are set for the second obstructing object, and
the predetermined position for the second obstructing object to appear is adjusted in accordance with the kind of the second obstructing object.

18. The non-transitory computer-readable storage medium according to claim 17, wherein adjustment is made so as not to cause the second obstructing object to appear at such a position that makes it impossible to advance the first game when the second obstructing object appears at the position.

19. The non-transitory computer-readable storage medium according to claim 10, wherein if an operation by the player has satisfied the predetermined condition on the second obstructing object that has appeared in the first game, information for causing the same object as the second obstructing object to appear, in at least one of the second games, as the second obstructing object in the second game, is transmitted so as to be included in the first game.

20. The non-transitory computer-readable storage medium according to claim 10, wherein a third image for giving a pre-notice of appearing positions of the first obstructing object and the second obstructing object is generated so as to be included in the display image.

21. The non-transitory computer-readable storage medium according to claim 10, wherein:
the game program, when executed, further causes the processor to at least:
select, on the basis of an operation by the player, one of a predetermined plurality of policies each of which is a policy for selecting at least one of the plurality of opponents, and
specify at least one of the plurality of opponents as a target on the basis of the selected policy, and
if the predetermined condition is satisfied on the first obstructing object in the first game, information for causing the second obstructing object to appear in the second game for the opponent specified as the target is transmitted so as to be included in the first game data.

22. A game apparatus comprising a processor and a memory coupled thereto, the processor being configured to control the game apparatus to at least:
start execution of a first game based on a game process that advances, wherein a game start timing of the first game is adjusted to be the same as game start timings of the plurality of opponents, the plurality of opponents using second information processing apparatuses that execute game processes;
perform a game process on the basis of an operation by a player in the first game;
transmit first game state data regarding a game state of the first game, to each of the other game apparatuses;
acquire second game state data regarding a game state of a second game executed in each of the other game apparatuses;
sequentially generate a display image including a first image based on the first game state data and a second image based on the acquired second game state data;
decrease a time limit set in advance for the player, with elapse of time;
if a predetermined condition is satisfied in the first game, add a predetermined value to the time limit;

end advancement of the first game, at least when the time limit reaches zero; and if advancement of the first game is ended, perform evaluation for a result of the first game relative to results of the plurality of second games, in accordance with a length of actual time that has elapsed since start of execution of the first game.

23. A game processing method executed by a computer of a first information processing apparatus, the method comprising:

starting execution of a first game based on a game process that advances, wherein a game start timing of the first game is adjusted to be the same as game start timings of the plurality of opponents, the plurality of opponents using second information processing apparatuses that execute game processes;

performing a game process on the basis of an operation by a player in the first game;

transmitting first game state data regarding a game state of the first game, to each of the second information processing apparatuses;

acquiring second game state data regarding a game state of a second game executed in each of the second information processing apparatuses;

sequentially generating a display image including a first image based on the first game state data and a second image based on the acquired second game state data;

decreasing a time limit set in advance for the player, with elapse of time;

if a predetermined condition is satisfied in the first game, adding a predetermined value to the time limit;

ending advancement of the first game, at least when the time limit reaches zero; and if advancement of the first game is ended, performing evaluation for a result of the first game relative to results of the plurality of second games, in accordance with a length of actual time that has elapsed since start of execution of the first game.

24. A game system comprising a plurality information processing apparatuses each including a processor and a memory coupled thereto, the processor being configured to control the game system to at least:

start execution of a first game which advances, wherein a game start timing of the first game is adjusted to be the same as game start timings of the plurality of game opponents, the plurality of opponents using second information processing apparatuses that execute game processes;

perform a game process on the basis of an operation by a player in the first game;

decrease a time limit set in advance for each player, with elapse of time;

if a predetermined condition is satisfied in the first game, add a predetermined value to the time limit;

end advancement of the first game, at least when the time limit reaches zero;

transmit first game state data regarding a game state of the first game;

sequentially generate a display image including a first image based on the game state data of each information processing apparatus itself and a second image based on the game state data of the other information processing apparatuses of the game opponents, and display the display image in the information processing apparatus in which the first game is executed; and if advancement of the first game is ended, perform evaluation for a result of the first game relative to results of games of the opponents, in accordance with a length of actual time that has elapsed since start of execution of the first game.

* * * * *